United States Patent
Koch et al.

(10) Patent No.: US 10,420,278 B2
(45) Date of Patent: *Sep. 24, 2019

(54) METHODS, SYSTEMS, AND APPARATUS FOR MONITORING YIELD AND VEHICLE WEIGHT

(71) Applicant: Precision Planting LLC, Tremont, IL (US)

(72) Inventors: Justin L. Koch, Morton, IL (US); Derek A. Sauder, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/613,816

(22) Filed: Jun. 5, 2017

(65) Prior Publication Data

US 2017/0265391 A1 Sep. 21, 2017

Related U.S. Application Data

(63) Continuation of application No. 14/868,366, filed on Sep. 28, 2015, now Pat. No. 9,668,411, which is a (Continued)

(51) Int. Cl.
*A01D 41/127* (2006.01)
*G01F 25/00* (2006.01)

(52) U.S. Cl.
CPC ..... *A01D 41/1272* (2013.01); *A01D 41/1271* (2013.01); *G01F 25/0046* (2013.01)

(58) Field of Classification Search
CPC ...... A01D 4/1271; A01D 4/1272; G01F 1/50; G01F 1/8431; G01F 1/8436; G01F 25/0046; G01G 23/01
See application file for complete search history.

(56) References Cited

U.S. PATENT DOCUMENTS 3,593,720 A 7/1971 Botterill et al.
5,173,079 A 12/1992 Gerrish
(Continued)

FOREIGN PATENT DOCUMENTS

EP 0856723 A2 5/1998
EP 1518452 A1 * 3/2005 ......... A01D 41/1271
(Continued)

OTHER PUBLICATIONS

Wagner, L.E. et al., "Grain flow measurement with a pivoted auger", Transactions of the ASAE (now ASABE), vol. 30 No. 6, Nov.- Dec. 1987, pp. 1583-1586. (Year: 1987).*
(Continued)

*Primary Examiner* — Behrang Badii
*Assistant Examiner* — David A Testardi

(57) ABSTRACT

Systems, methods and apparatus for monitoring yield while harvesting. In one embodiment a mass flow rate sensor measures the mass flow rate of the harvested grain. A weight sensor measures the weight of the harvested grain. The measured mass flow rate is correlated with the weight of the harvested grain. Processing circuitry calculates any error in the measured mass flow rate using the measured weight. The calculated error is used to correct any inaccuracy in the measured mass flow rate.

2 Claims, 20 Drawing Sheets

Related U.S. Application Data continuation of application No. 13/996,700, filed as application No. PCT/US2011/066826 on Dec. 22, 2011, now Pat. No. 9,144,195.

(60) Provisional application No. 61/426,376, filed on Dec. 22, 2010.

(56) References Cited

U.S. PATENT DOCUMENTS

| | | | |
|---|---|---|---|
| 5,327,708 A * | 7/1994 | Gerrish | A01F 12/00 460/7 |
| 5,343,761 A * | 9/1994 | Myers | A01C 7/105 73/861 |
| 5,351,558 A | 10/1994 | Horn et al. | |
| 5,369,603 A * | 11/1994 | Myers | G01D 3/02 702/104 |
| 5,487,702 A * | 1/1996 | Campbell | A01F 12/50 460/7 |
| 5,561,250 A | 10/1996 | Myers | |
| 5,594,667 A * | 1/1997 | Myers | A01D 41/1271 702/100 |
| 5,686,671 A | 11/1997 | Nelson et al. | |
| 5,708,366 A | 1/1998 | Nelson | |
| 5,736,652 A | 4/1998 | Strubbe | |
| 5,750,877 A * | 5/1998 | Behnke | A01D 41/1271 460/7 |
| 5,798,466 A | 8/1998 | Satake et al. | |
| 5,837,906 A | 11/1998 | Palmer | |
| 5,957,773 A * | 9/1999 | Olmsted | A01D 41/1208 460/149 |
| 5,970,802 A | 10/1999 | Strubbe | |
| 6,138,518 A | 10/2000 | Strubbe | |
| 6,185,990 B1 | 2/2001 | Missotten et al. | |
| 6,367,336 B1 | 4/2002 | Martina et al. | |
| 6,404,344 B1 | 6/2002 | Young | |
| 6,460,008 B1 | 10/2002 | Hardt | |
| 6,508,049 B1 | 1/2003 | Cox et al. | |
| 6,636,820 B2 | 10/2003 | Livingston | |
| 6,751,515 B2 | 6/2004 | Moore | |
| 6,820,459 B2 | 11/2004 | Beck et al. | |
| 6,871,483 B1 | 3/2005 | Panoushek | |
| 6,899,616 B1 | 5/2005 | Murray et al. | |
| 6,983,217 B2 | 1/2006 | Moore | |
| 7,089,117 B2 | 8/2006 | Maertens | |
| 7,257,503 B1 | 8/2007 | Anderson et al. | |
| 7,310,046 B2 | 12/2007 | Young | |
| 7,507,917 B2 | 3/2009 | Kaltenheuser | |
| 7,728,720 B2 | 6/2010 | Anderson | |
| 8,347,709 B2 | 1/2013 | Kormann | |
| 9,144,195 B2 * | 9/2015 | Koch | A01D 41/1272 |
| 9,668,411 B2 * | 6/2017 | Koch | A01D 41/1272 |
| 2002/0024666 A1 | 2/2002 | Thomasson et al. | |
| 2002/0133309 A1 | 9/2002 | Hardt | |
| 2004/0050138 A1 | 3/2004 | Beck et al. | |
| 2005/0003875 A1 * | 1/2005 | Beck | G01F 25/0007 460/7 |
| 2005/0026662 A1 * | 2/2005 | Fechner | A01D 41/1271 460/1 |
| 2006/0046800 A1 | 3/2006 | Kaltenheuser | |
| 2010/0048269 A1 | 2/2010 | Ricketts et al. | |
| 2010/0106428 A1 | 4/2010 | Anderson | |

FOREIGN PATENT DOCUMENTS

| | | | | |
|---|---|---|---|---|
| EP | 1518452 A1 | | 3/2005 | |
| GB | 2216763 A | * | 10/1989 | ......... A01D 41/1271 |
| JP | 10229740 A | * | 9/1998 | |
| JP | 10229740 A | | 9/1998 | |
| JP | 2003000047 A | * | 1/2003 | ......... A01D 41/1271 |
| JP | 2003000047 A | | 1/2003 | |
| UA | 51025 A | | 11/2002 | |
| UA | 96902 C2 | | 12/2011 | |

OTHER PUBLICATIONS

Wagner, L.E. et al., "Yield determination using a pivoted auger flow sensor", Transactions of the ASAE (now ASABE), vol. 32 No. 2, Mar.-Apr. 1989, pp. 409-413. (Year: 1989).*

Al-Mahasneh, M.A. et al., "Verification of Yield Monitor Performance for On-the-Go Measurement of Yield with an In-Board Electronic Scale", Transactions of the ASAE (now ASABE), vol. 43 No. 4, 2000, pp. 801-807. (Year: 2000).*

Chosa, Tadashi et al., "A study on yield monitoring system for head-feeding combines (Part 1)", in Japanese, Journal of the Japanese Society of Agricultural Machinery, vol. 64 Issue 6, 2002, pp. 145-153 (Year: 2002).*

JPO machine translation of JP 2003-47 (original JP document published Jan. 7, 2003) (Year: 2003).*

Chosa, Tadashi et al., "Yield monitoring system for a head feeding combine", JARQ (Japan Agricultural Research Quarterly) vol. 40 No. 1, 2006, pp. 37 to 43. (Year: 2006).*

Translation of UA Decision on Grant for UA patent application No. a 2013 09117, dated Apr. 26, 2017, pp. 1-7, Ukraine.

Australia Patent Office Action, Application No. 2017200593; dated May 22, 2018, 3 pages.

Australia Patent Office Action, Application No. 2011348137; dated Oct. 26, 2015, 3 pages.

Brazil Patent Office Action, Application No. BR112013016262.7; dated Jul. 10, 2018, 11 pages.

Canada Patent Office Action, Application No. 2822099; dated Dec. 27, 2017, 3 pages.

European Patent Office Extended European Search Report, Application No. 18168863.1; dated Aug. 6, 2018, 8 pages.

European Patent Office Extended European Search Report, Application No. 11849925.0; dated Oct. 25, 2016, 6 pages.

International Search Report and Written Opinion, PCT Application No. PCT/US2011/066826, dated Apr. 27, 2012, 7 pages.

Ukraine Patent Office Action, Application No. a201309117; dated Feb. 10, 2016, 4 pages.

J. & M. Manufacturing Co., Inc., "Owner's Manual Patented Single Auger Grain Carts", Ft. Recovery, Ohio; Feb. 11, 2009, 29 pages.

* cited by examiner

METHODS, SYSTEMS, AND APPARATUS FOR MONITORING YIELD AND VEHICLE WEIGHT

CROSS-REFERENCE TO RELATED APPLICATIONS

This is a continuation of U.S. application Ser. No. 14/868,366, filed Sep. 28, 2015, which is a continuation of U.S. application Ser. No. 13/996,700 filed Jun. 21, 2013, now U.S. Pat. No. 9,144,195, which is the National Stage of International Application No. PCT/US2011/066826 filed Dec. 22, 2011, which claims the benefit of U.S. Provisional Application No. 61/426,376, filed Dec. 22, 2010.

BACKGROUND

FIG. 1A illustrates a conventional harvester or combine 10. As the operator in cab 12 drives the combine 10 through the field, the crop being harvested is drawn through the header 15 which gathers the plant material and feeds it into the feederhouse 16. The feederhouse 16 carries the plant material into the combine where the grain is separated from the other plant material. The separated grain is then carried upward by the grain elevator 120 (FIG. 1B) to the fountain auger 150 which carries the grain into the grain tank 20. The other plant material is discharged out the back of the combine.

When the grain tank 20 becomes full, a transport vehicle such as grain cart, wagon or truck is driven up next to the combine or the combine drives to the awaiting transport vehicle. The unloading auger 30 is swung outwardly until the end is positioned over the awaiting transport vehicle. A cross-auger 35 positioned in the bottom of the grain tank 20 feeds the grain to the extended unloading auger 30 which in turn deposits the grain into the awaiting transport vehicle below.

Live or real-time yield monitoring during crop harvesting is known in the art. One type of commercially available yield monitor uses a mass flow sensor such as mass flow sensor 130 illustrated in FIG. 1B and as disclosed in U.S. Pat. No. 5,343,761, which is hereby incorporated herein in its entirety by reference. Referring to FIG. 1B, as the grain 110 is discharged from the elevator 120 it strikes an impact plate 140. Sensors associated with the mass flow sensor 130 produce a voltage related to the force imposed on the impact plate 140. The volumetric flow of grain can then be calculated based on the voltage such that the mass flow sensor 130 determines a grain flow rate associated with grain within the combine 10. Such systems also employ various methods of recording the speed of the combine in operation. Using the speed and the width of the pass being harvested (usually the width of the header), it is possible to obtain a yield rate in bushels per acre by dividing the mass of grain harvested over a particular time period by the area harvested. In addition to reporting the current yield rate, such systems often incorporate GPS or other positioning systems in order to associate each reported yield rate with a discrete location in the field. Thus a yield map may be generated for reference in subsequent seasons.

Most commercially available systems also utilize a sensor to determine the moisture of the grain as it is being harvested. Sensing the grain moisture permits the operator to determine the likely time or expense required to dry the harvested crop and it also allows the yield monitor to report more useful yield data by correcting for water content. Because grain is dried before long-term storage and sale (e.g., to an industry-standard 15.5% moisture), the as-harvested moisture level can be used to calculate the weight of saleable grain per acre.

While harvesting, various factors affect the reliability of the mass flow sensor. Changes in crop yield, grain type, seed variety and genetics, grain moisture, and ambient temperature are known to change the flow characteristics of the grain and thus change the signal produced by the sensor for the same mass flow rate. Due to these changing conditions during operation, it is well known that mass flow sensors may be inaccurate without proper calibration.

For this reason, manuals provided with commercially available yield monitors generally instruct the operator to occasionally carry out a calibration routine. Most commonly, when a load of grain is unloaded into a weigh wagon or scale, the operator enters the measured weight of grain, and the yield monitor system applies a correction factor to its signal by comparing the measured weight with its calculated accumulation of mass.

One of several disadvantages of this load-by-load calibration method is that it is time-consuming and is often simply not performed on a regular basis by the operator. Recognizing that many producers do not perform regular calibrations and in an attempt to automate the calibration process, some grain carts have been adapted to wirelessly transmit the load weight to the yield monitor system, as disclosed in U.S. Pat. No. 7,073,314 to Beck et al. However, where multiple grain carts are used, this method requires instrumentation of additional machines in order to obtain a load-by-load calibration, and no calibration is likely feasible when the operator offloads grain directly into a grain truck. Additionally, load-by-load calibration may not be possible when, for example, the grain tank can only be partially unloaded. Moreover, this method does not eliminate the inherent defects of load-by-load calibration discussed below.

Even if the operator or yield monitor system regularly performed a calibration routine, many of the conditions that affect the mass flow sensor change numerous times throughout accumulation of each load such that the calibration routine is unable to correct for such changes. Put another way, the various changes in conditions that require mass flow sensor correction will rarely coincide with a load-by-load calibration schedule. For example, a load of high-moisture grain may be harvested and used to recalibrate the mass flow sensor just before entering a drier area of the field, causing the mass flow sensors to be more inaccurate than if no calibration had been performed.

As such, there is a need for a system and method of accurately calibrating the mass flow rate sensor of a yield monitor while harvesting.

DETAILED DESCRIPTION

Calibration Methods

Figure 1A:
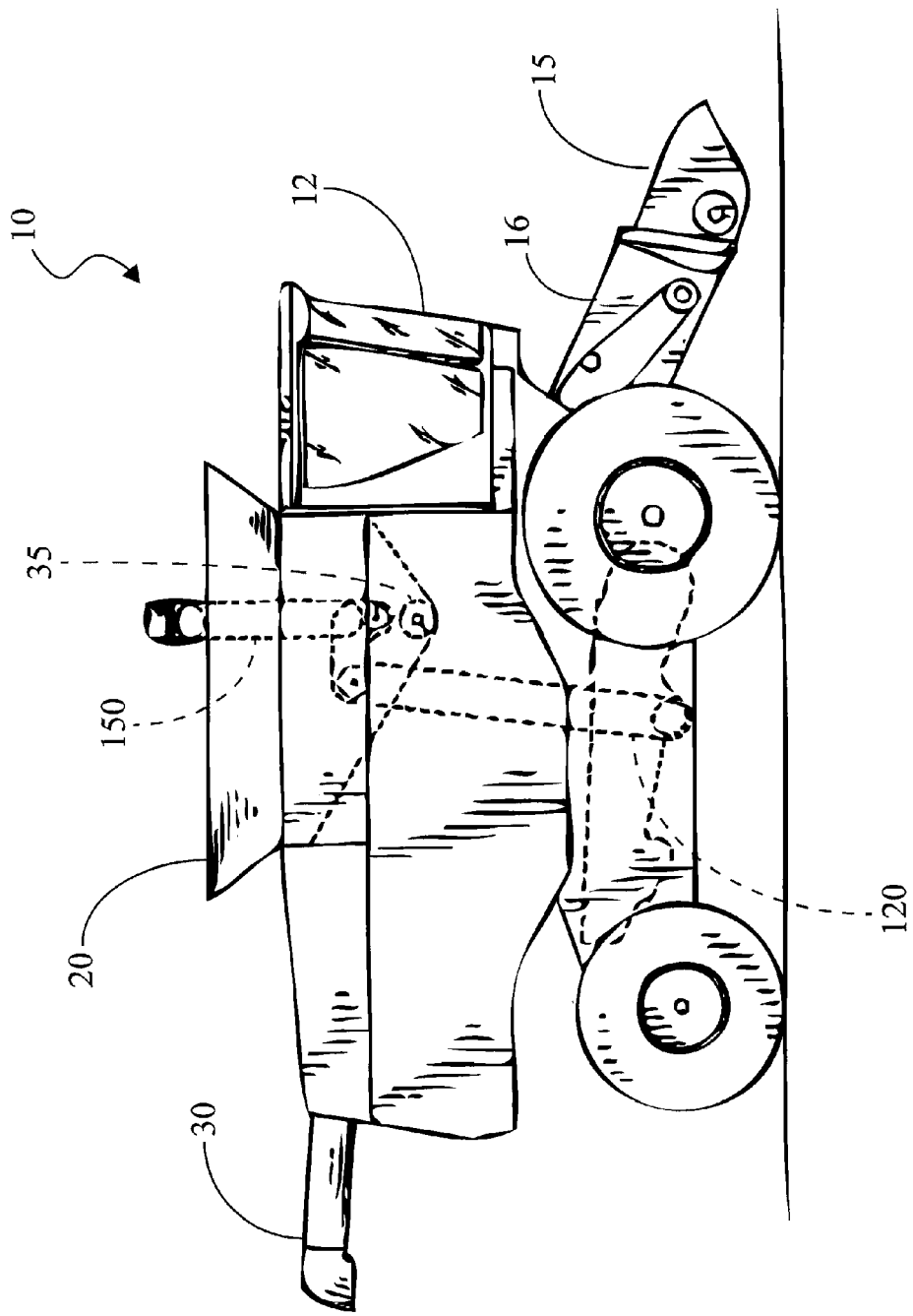
FIG. 1A is a perspective view of a conventional combine harvester.
Figure 1B:
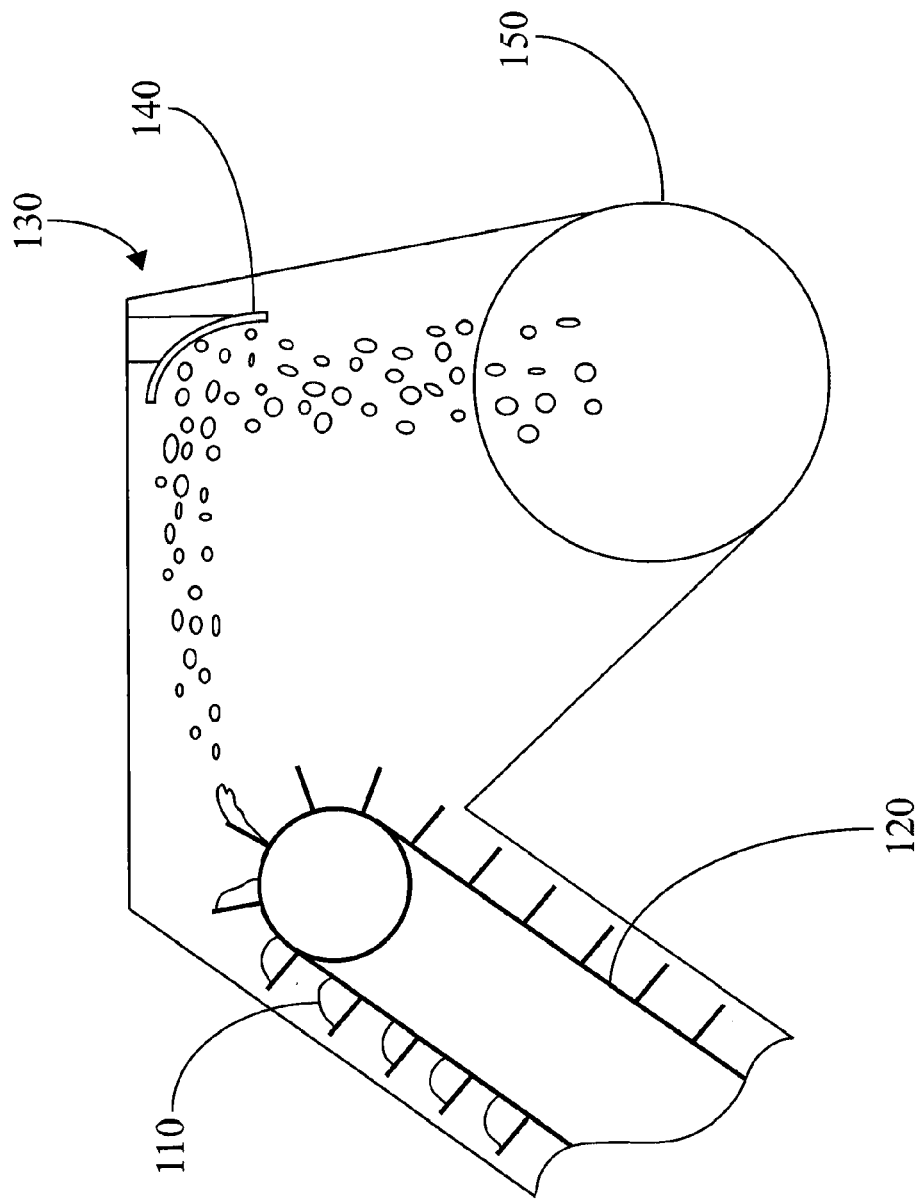
FIG. 1B illustrates a conventional mass flow sensor.
Figure 2A:
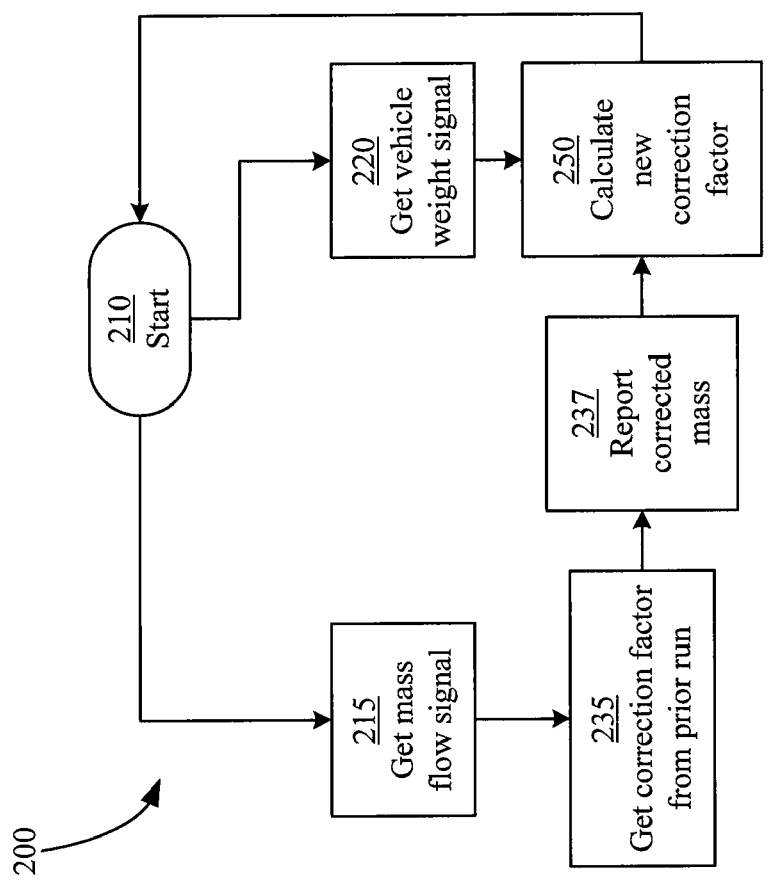
FIG. 2A illustrates an embodiment of a process for calibrating a mass flow sensor.

Referring now to the drawings wherein like reference numerals designate the same or corresponding parts throughout the several views, FIG. 2A is flow diagram showing steps of a preferred process 200 for calibrating a mass flow sensor 130 (FIG. 1B). On initiation of the start step 210, two measurement steps 215 and 220 begin. At step 215, a mass flow rate signal is obtained from a mass flow sensor. At step 220, a vehicle weight signal related to the vehicle weight of the combine harvester is obtained from a vehicle weight measurement system. At step 235, a mass flow correction factor is preferably obtained from the prior run and multiplied by the measured mass of grain harvested in order to obtain a corrected mass flow rate. At step 237, the corrected mass flow measurement is preferably reported, time-stamped and stored for further processing. At step 250, an error between the mass flow signal and the vehicle weight signal is determined and new mass flow correction factor is calculated. The new mass flow correction factor is preferably stored for use at step 235; that is, the new mass flow correction factor is applied to subsequent measured mass flow rates.

The determination of error and calculation of a new correction factor at step 250 can be performed according to various methods. One method is to simply divide the integral of the mass flow signal by the change in total vehicle weight. However, a first problem with this method is that the vehicle weight does not change simultaneously with the mass flow signal, i.e., grain striking the impact plate 140 (FIG. 1B) of the mass flow sensor 130 already affected the total vehicle weight at the point of harvest. This problem may be partially corrected by measuring the time during which the mass-flow sensor signal continues to read a non-zero value after the combine stops harvesting, and then time-shifting the mass flow signal to better match the vehicle weight signal. Another problem with this method is that the vehicle weight measurement at any given time, or even the change in measured vehicle weight between any two discrete times, may not be reliable due to changing vehicle slope and other changing conditions (as discussed with respect to the various embodiments of the vehicle weight system below).

Moreover, empirical data have shown that mass flow sensors are relatively accurate during operation except when the combine encounters occasional changes in field or crop conditions. When field or crop conditions change, the slopes of the measured cumulative mass flow data will become significantly different than the slope of the measured vehicle weight data whereby the data sets will begin to track away from one another. An occasional slope correction to the mass flow sensor data will "fit" the data sets closely, but the data sets must be monitored on a nearly continuous basis in order to apply the correction at the appropriate times.

Figure 2B:
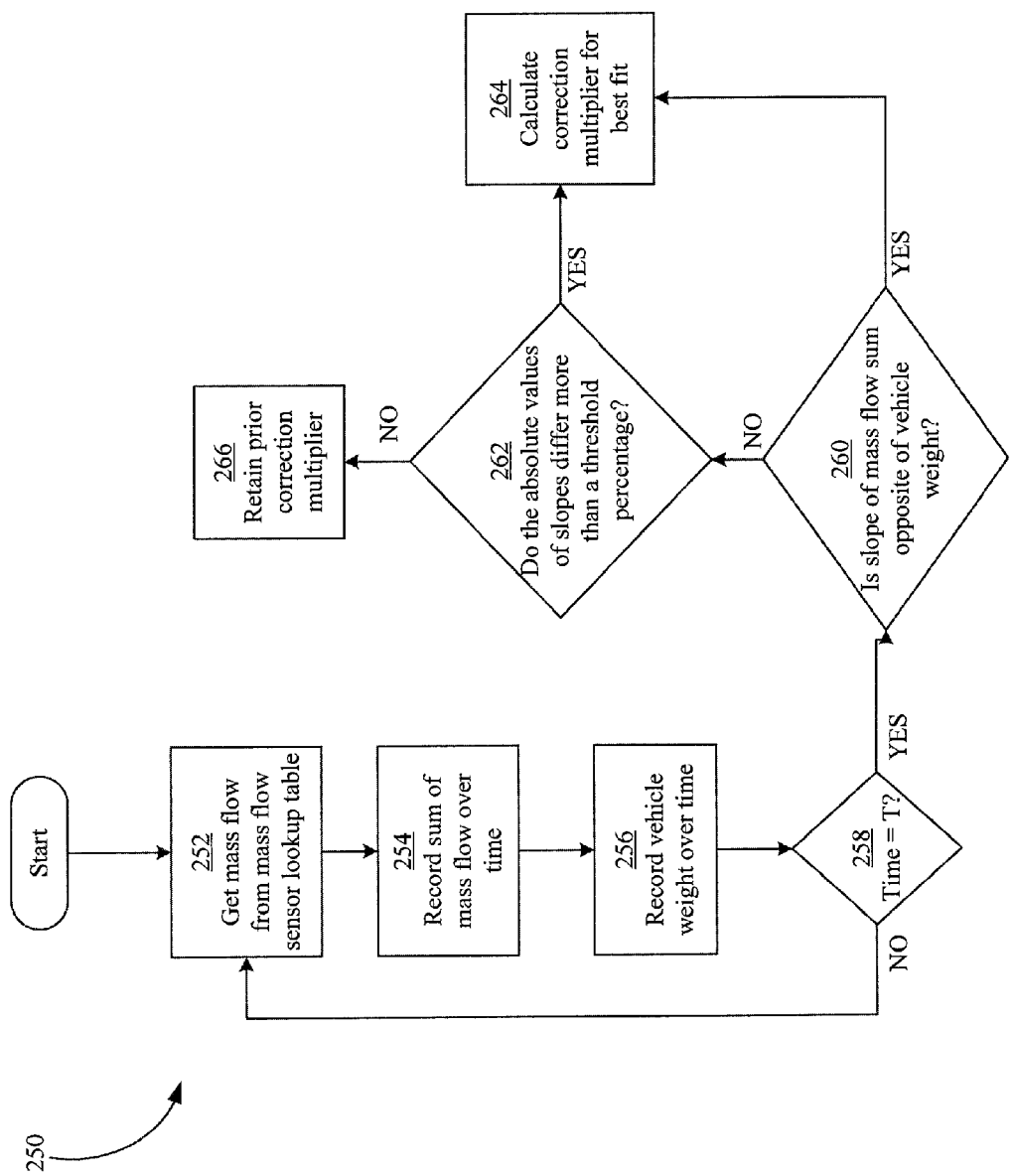
FIG. 2B illustrates another embodiment of a process for calibrating a mass flow sensor.

In light of the problems and empirical results discussed above, another process for correcting weight at step 250 is shown by the flow diagram of FIG. 2B. In the FIG. 2B process, the necessity of a correction factor is determined based on the relative slope of the vehicle weight data and the cumulative mass flow data. At step 252, a mass flow rate is preferably obtained from a lookup table (described in further detail with respect to FIG. 2C) in light of the signal from the mass flow sensor 130. At step 254 the mass flow rate as well as a cumulative sum of the mass flow rate is recorded and preferably time-stamped. At step 256 the vehicle weight is recorded and preferably time-stamped. At step 258, the processes of steps 252, 254 and 256 are repeated, preferably until a measuring period T (e.g., 10 seconds) is reached. At steps 260 and 262, the slope (i.e., rate of change) of the mass flow over time is compared to the slope (i.e., rate of change) of the vehicle weight over time. If the signs indicating direction of the slopes are different or the absolute value of the slopes differ by more than a threshold percentage (e.g., 1 percent), then a new correction factor is calculated at step 264. Otherwise the prior correction factor (if any) is preferably retained at step 266. It should be appreciated that retaining the prior correction factor may not comprise a positive algorithmic step.

It should be appreciated that in addition to comparing rates of change, the flow-based weight change estimate may be compared over the recording period T to a weight-based weight change estimate (preferably derived from the difference in the weight signal at the beginning and end of the recording period) such that an appropriate correction factor may be determined.

Figure 2C:
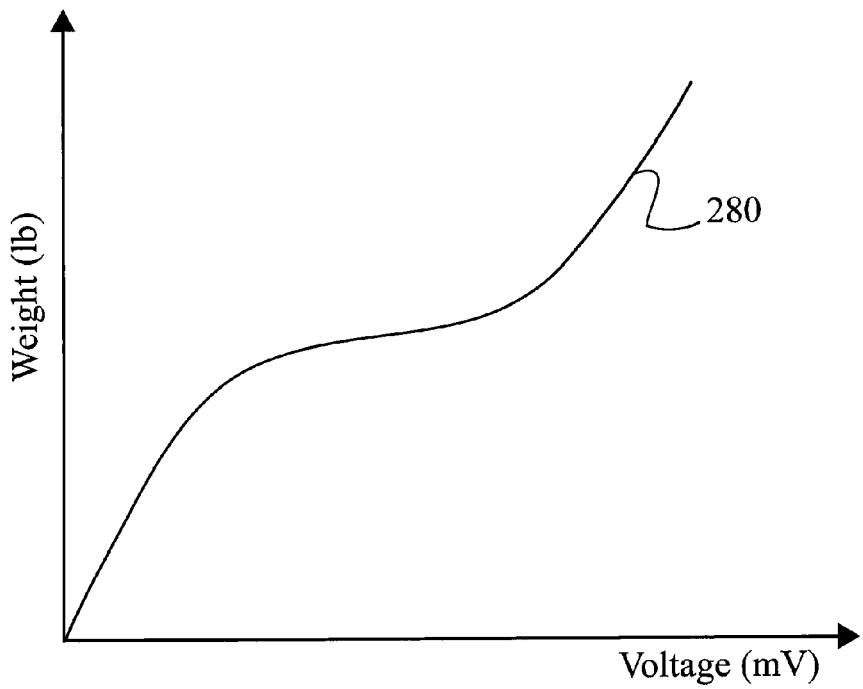
FIG. 2C illustrates a calibration characteristic for a mass flow sensor.

The lookup table preferably consulted at step 252 preferably comprises a set of calibration curves 280 as illustrated in FIG. 2C. The response of some commercially available impact type mass flow sensors is non-linear with the mass flow rate as is well known in the art. The shape of this non-linear relationship may vary with factors such as grain type, vehicle incline, and moisture content. Thus a set of calibration curves 280 corresponding to each range of such factors may be empirically developed and consulted to determine the mass flow rate of the sensor at step 252.

Figure 2D:
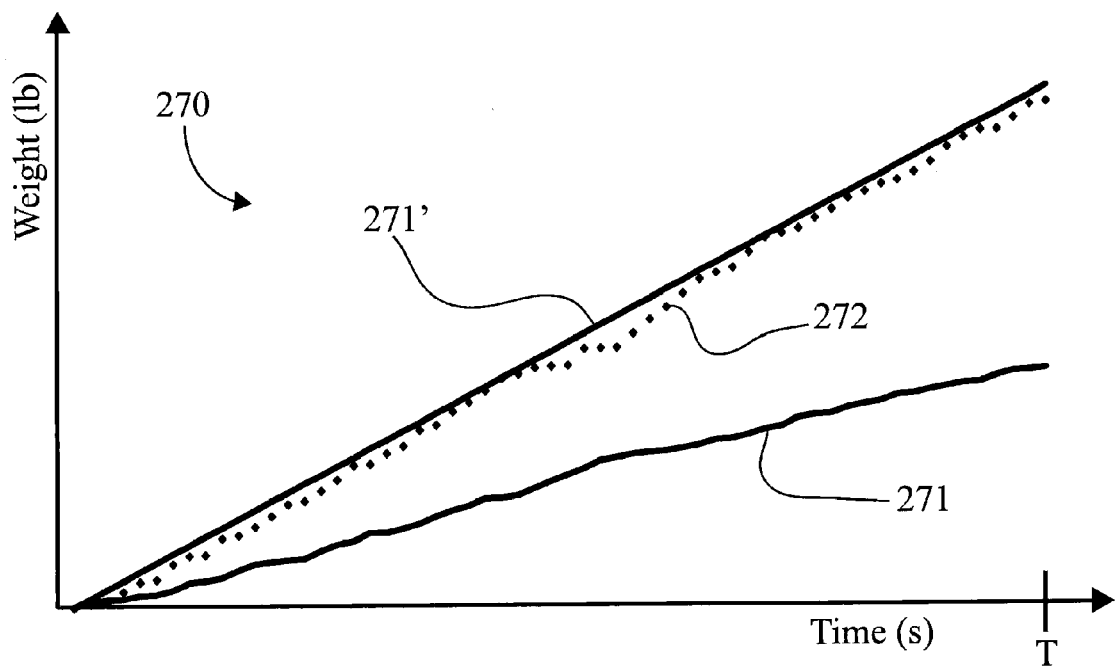
FIG. 2D illustrates vehicle weight and mass flow sensor data.

The calculation of a new correction factor at step 264 is carried out to best fit the cumulative mass flow rate data to the vehicle weight data over measuring period T or multiple measuring periods T. The correction factor may comprise a single linear multiplier. FIG. 2D is an illustrative data set 270. Data set 270 includes a vehicle weight data 272 (represented by a scatter plot) and cumulative mass flow rate data 271 (represented by a line plot). Over measuring period T (in FIG. 2D, 60 seconds), the slope of cumulative mass flow rate data 271 differs significantly from the slope of vehicle weight data 272. Thus a corrected slope (illustrated by line 271') is preferably used. To achieve this, a correction factor (k) is calculated as the ratio between the slope of line 271' and slope of a line that best fits mass flow rate data 271.

It should be appreciated that more complex correction method may be used to fit the data sets rather than multiplying by a constant. For example, an alternative method may determine the requisite coefficients to input the mass flow sensor data into a first-order, second-order, third-order or fourth-order polynomial that best fits the vehicle weight data over the measuring period T. It should also be appreciated that in some applications, signal processing methods known in the art (such as anti-aliasing or low-pass filters) may be applied to either or both of the vehicle weight and mass flow rate signals in order to avoid recording erroneous data.

Calibration Systems

Figure 3:
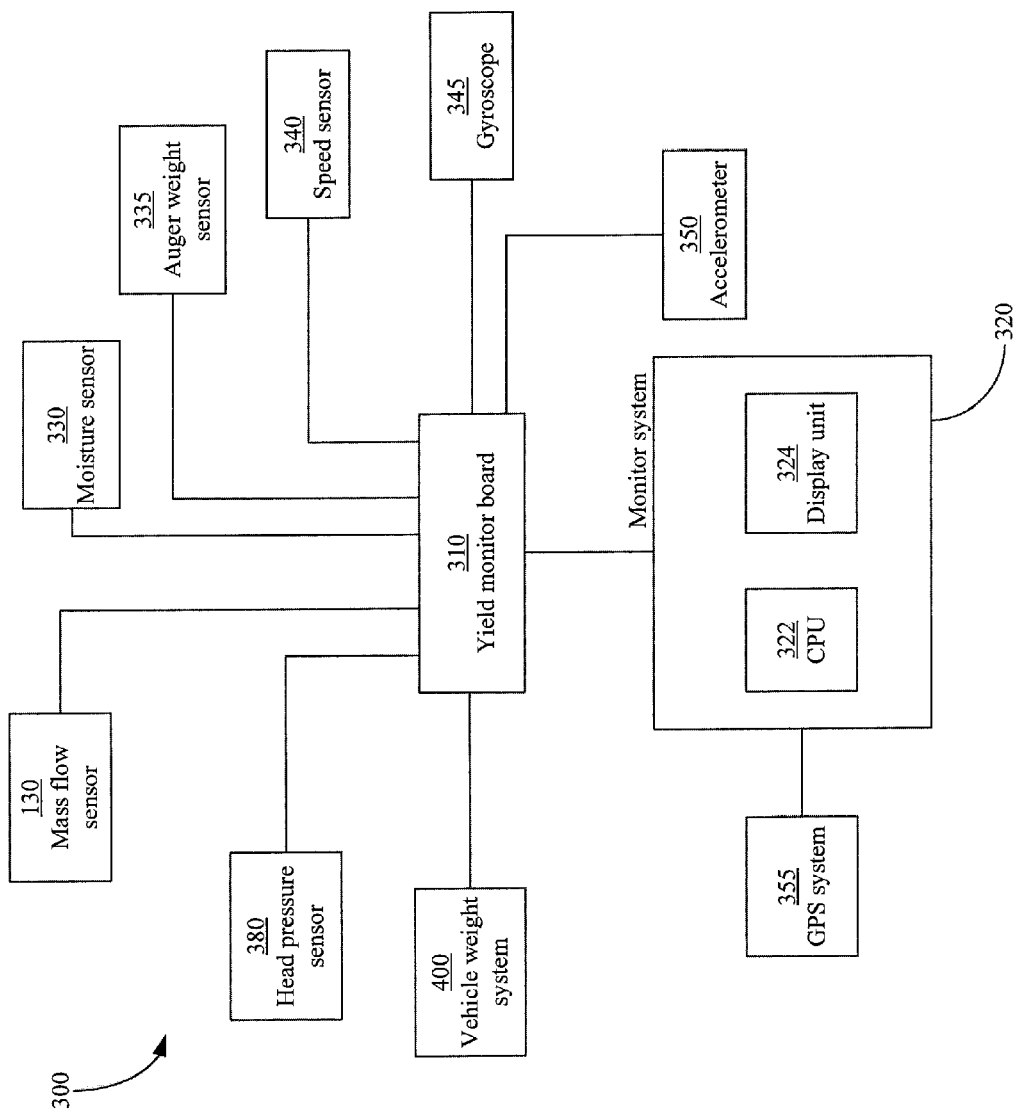
FIG. 3 illustrates an embodiment of a system for calibrating a mass flow sensor.

FIG. 3 is a schematic illustration of a calibration system 300 preferably used to carry out the process 200. The calibration system 300 preferably includes a vehicle weight system 400, a yield monitor board 310, a monitor system 320, a moisture sensor 330, an auger weight sensor 335, a speed sensor 340, one or more gyroscopes 345, one or more accelerometers 350 (preferably three-axis accelerometers), a GPS system 355, a mass flow sensor 130, a head pressure sensor 380 and a mass flow sensor 130.

The monitor system 320 preferably includes a display unit 324 and processing circuitry including a central processing unit (CPU) 322. The display unit 324 is preferably a graphical user interface configured to allow the operator to enter commands. The monitor system 320 is preferably mounted in the cab 12 (FIG. 1A) of the combine 10 such that a user can view the display unit 324. In some embodiments, the monitor system 320 may also be configured to display planting information such as that disclosed in Applicant's co-pending U.S. application Ser. No. 13/292,384, incorporated herein in its entirety by reference. In such embodiments, the monitor system 320 is preferably configured to display maps overlaying planting information with yield data and to compare planting information to yield data.

The yield monitor board 310 is preferably mounted to the combine 10. The gyroscope 345 and accelerometer 350 are preferably in electrical communication with the yield monitor board 310 and mounted thereto. The speed sensor 340, the moisture sensor 330, mass flow sensor 130, head pressure sensor 380 and vehicle weight system 400 are all preferably in electrical communication with the yield monitor board 310 which is, in turn, in electrical communication with the monitor system 320. The GPS system 355 is also preferably in electrical communication with the monitor system 320.

The speed sensor 340 is preferably configured to measure the speed of an axle of the combine as is known in the art. Upon each rotation or partial rotation of the axle, the speed sensor 340 preferably sends an encoder pulse to the yield monitor board 310. The monitor system 320 preferably determines the speed of the axle from the time between each encoder pulse.

Vehicle Weight Measurement Systems

Figure 4A:
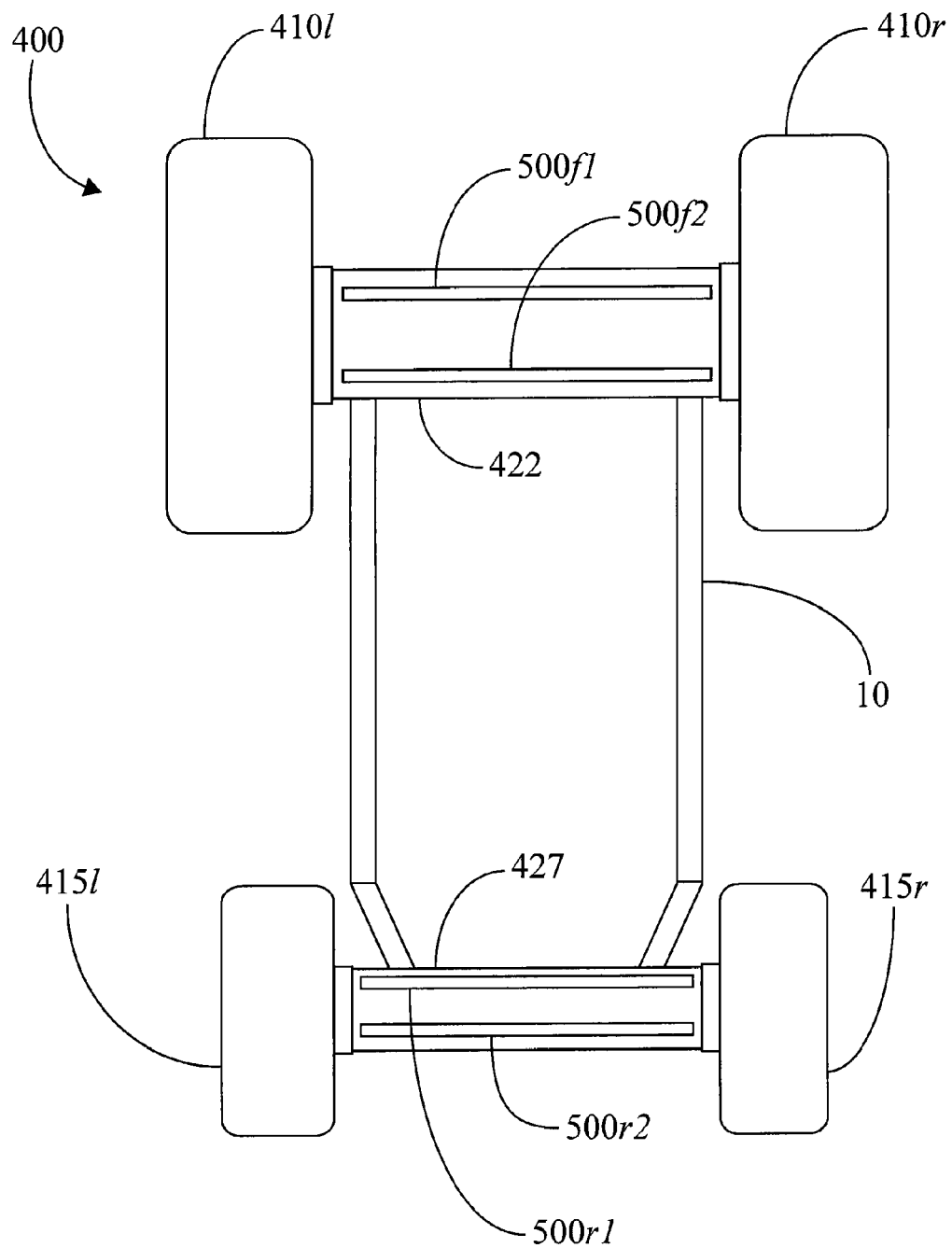
FIG. 4A is a top plan view of an embodiment of a vehicle weight system.

FIG. 4A illustrates one embodiment of the vehicle weight system 400. The vehicle weight system 400 generally includes a set of extensometers 500 (described in detail later) attached to the combine 10. As illustrated, the combine 10 includes front tires 410, front axle 422, rear tires 415, and rear axle 427. One embodiment of the vehicle weight system 400 includes a pair of front extensometers 500f1 and 500f2 mounted to the front axle 422, and a pair rear extensometers 500r1 and 500r2 mounted to the rear axle 427. Each extensometer 500 has a rightmost end and a leftmost end and is preferably mounted to the respective axle at two locations near said rightmost end and near said leftmost end. Each extensometer 500 is preferably mounted using brackets 460 (FIG. 4B) or other suitable apparatus fixed securely to the respective axle. Each extensometer 500 is preferably in substantial alignment with the respective axle to which it is mounted. Each extensometer 500 is preferably in electrical communication with the yield monitor board 310.

Figure 4B:
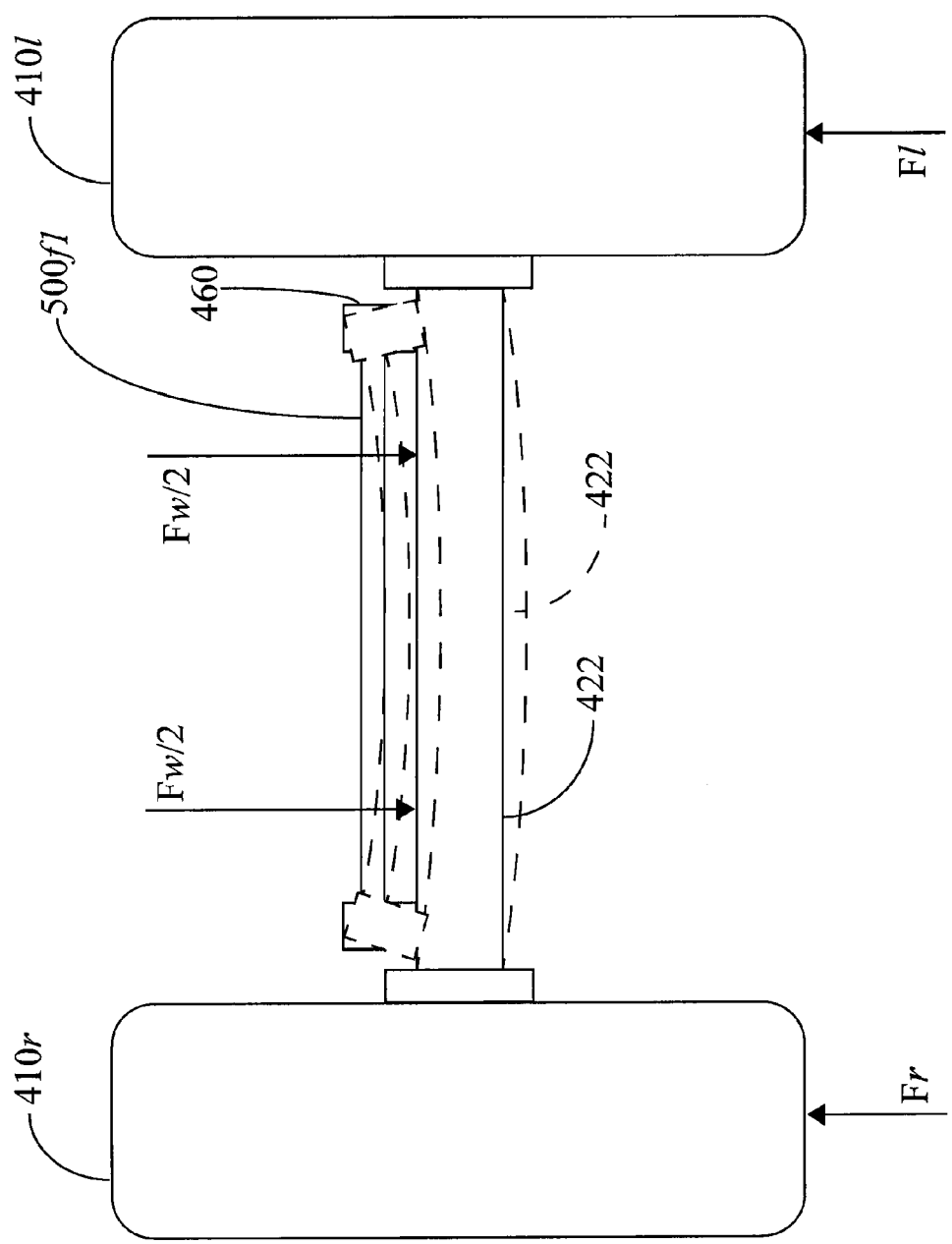
FIG. 4B is a schematic elevation view of the front axle of a harvester illustrating the loading on the front axle and the vehicle weight system of FIG. 4A.

In operation of the vehicle weight system 400, the weight of combine 10 is carried by the axles, 422, 427 which transfer the load to the front and rear tires 410, 415, respectively. Thus, bending stresses are imposed on the front axle 422 and the rear axle 427. FIG. 4B is a schematic illustration of the loads acting on the front axle 422. The portion of the weight of the combine 10 carried by the front axle 422 is identified as Fw. The weight Fw is applied at two points where the combine frame is attached to the axles, resulting in a force Fw/2 at each point of attachment. The load Fw is transferred to the soil by the front tires 410 resulting in a reaction force designated by forces Fr and Fl at each front tire 410. Although not shown, corresponding loads and reaction forces resulting in bending stresses are experienced by the rear axle 427. It should be appreciated that as the load on the axles 422, 427 increases due to more grain being added to the grain hopper as the crop is being harvested, the bending stresses on the axles will increase. These increased bending stresses will result in the inward displacement of the brackets 460 toward one another as the axle bends as shown exaggerated by hidden lines in FIG. 4B. As the brackets are displaced inwardly, the extensometers 500 generate a corresponding increase in voltage which is communicated to the yield monitor board 310. The sum of the voltages from the extensometers 500 is proportional to the weight of the combine 10 and the magnitude of the force Fw imposed on each axle.

In some embodiments, the front extensometers 500f1 and 500f2 may be omitted such that only the rear axle 427 is instrumented with extensometers 500r1 and 500r2. It should be appreciated that in such embodiments the accuracy of the vehicle weighing system will be compromised; nevertheless, after a longer period of operation such an embodiment would still provide a useful indication of how far the mass flow sensor 130 has "drifted" according to the methods described with respect to FIGS. 2A and 2B.

Vehicle Weight Measurement Apparatus

Figure 5A:
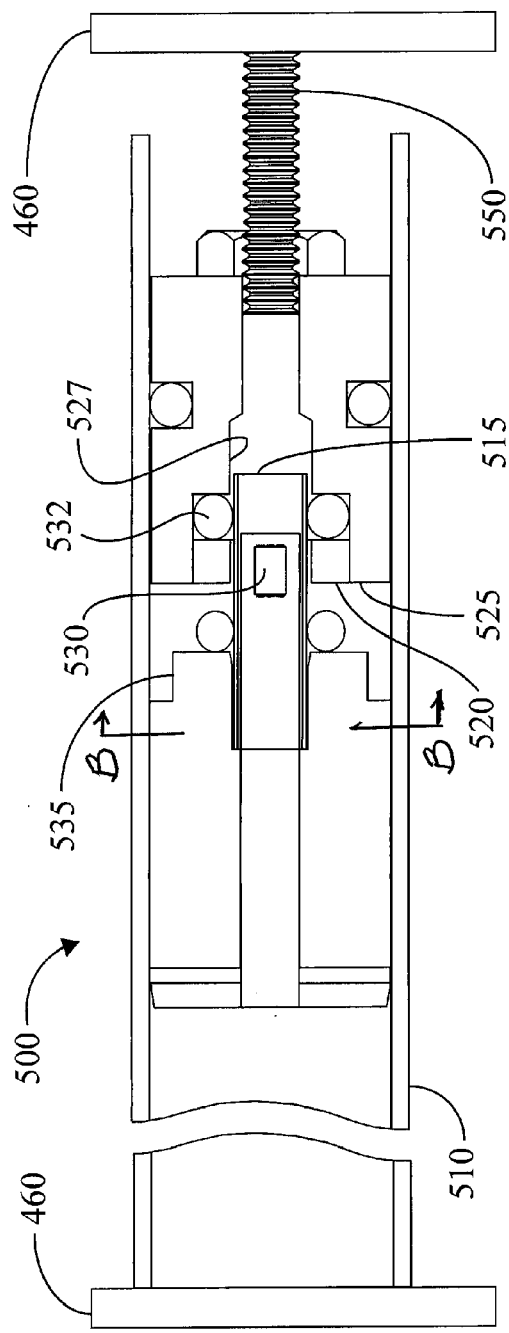
FIG. 5A is a cross-sectional view of an embodiment of an extensometer.

FIG. 5A illustrates a cross-section of an embodiment of an extensometer 500. The extensometer 500 preferably includes a conduit 510, a sensor 530, a sensor holder 535, a magnet 520, and a magnet holder 525.

Figure 5C:
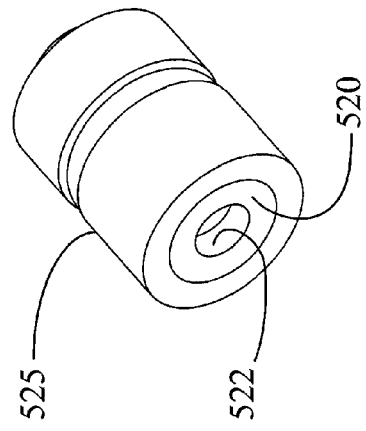
FIG. 5C is a perspective view of the magnet holder of FIG. 5A.
Figure 5B:
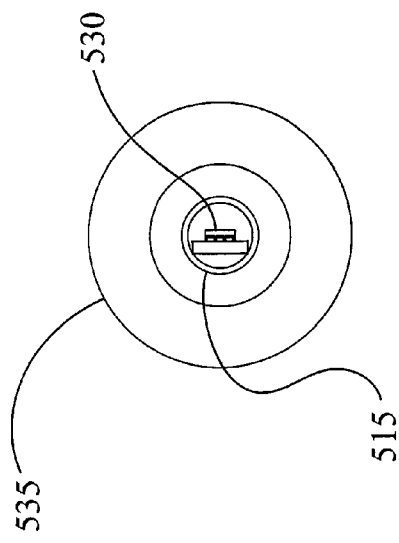
FIG. 5B is a cross-sectional view of the sensor holder as viewed along lines B-B of FIG. 5A.

The conduit 510 is mounted at a first end to a first bracket 460. The sensor holder 535 is fixed (e.g., press fit) within the conduit 510. A tube 515 is preferably mounted within the sensor holder 535. As best seen in FIG. 5B, the sensor 530 is housed within the tube 515, preferably by potting.

The magnet holder 525 is slidably housed within the conduit 510. The magnet holder 525 is fixed to a rod 550. The rod 550 is fixed to a second bracket 460 near a second end of conduit 510. The magnet 520 is preferably mounted within the magnet holder 525, as best viewed in FIG. 5C. The magnet 520 preferably includes an aperture 522. The magnet holder 525 includes a cavity 527. The tube 515 preferably extends through the magnet aperture 522 and into the magnet holder cavity 527. The tube is preferably radially constrained by an o-ring 532 housed within magnet holder 525.

The sensor 530 may be any sensor configured to emit a signal proportional to a magnetic field experienced by the sensor. The sensor 530 is preferably a Hall Effect sensor such as model number A1392 available from Allegro MicroSystems, Inc. in Saitama, Japan. The sensor 530 is in electrical communication with the yield monitor board 310.

In operation, as the brackets 460 move relative to one another as described above and illustrated in FIG. 4B, the magnet holder 525 moves within the conduit 510 such that the magnet holder 525 and sensor holder 535 move relative to one another. Thus the sensor 530 moves within the aperture 522 in the magnet 520. The magnet 520 develops a magnetic field within the aperture 522. The magnitude of the magnetic field varies along the width of the magnet 520 (right-to-left as viewed in FIG. 5A). As the sensor 530 moves within the magnetic field, the sensor 530 sends a signal to the yield monitor board 310, the voltage of which signal is proportional to the magnitude of the magnetic field at the location of sensor 530. Thus the voltage produced by the sensor 530 is related to the position of the sensor 530 within the magnet 520. Likewise, the voltage produced by the sensor 530 is related to the relative displacement of the brackets 460.

It should be appreciated that other embodiments of the extensometer 500 may include a magnet 520 having a different shape and different locations of the sensor 530 with respect to the magnet 520. However, the embodiment described with respect to FIGS. 5A-5C is preferable because within the aperture 522, the magnitude of the magnetic field adjacent to the magnet 520 varies substantially and with substantial linearity within the aperture along the width of the magnet 520.

It is preferable to use two extensometers 500 mounted to each axle due to complex loading scenarios experienced by the axles during operation. For example, if one of the axles were placed in forward or rearward bending in the direction of travel of the combine 10 (i.e., transverse to the vertical forces Fw illustrated in FIG. 4B), the brackets 460 would experience relative displacement unrelated to a change in weight of the combine 10. However, with two extensometers 500, such bending moves one pair of brackets 460 farther apart while moving the other pair of brackets 460 closer together, such that the sum of the voltages sent by the extensometers 500 remains substantially unaffected. A similar reduction in error is observed if either axle is placed in torsion. It should also be appreciated that the extensometers 500 may be mounted to the bottom of the axles 422, 427 such that the brackets 460 move farther apart as the weight of the combine 10 increases.

Processing Mass Flow Data

The calibration system 300 also preferably processes the corrected mass flow data into yield data. While the calibration method described with respect to FIGS. 2A and 3 is carried out while harvesting, the corrected mass flow data are stored by the monitor system 320. The monitor system 320 preferably integrates mass flow data over each discrete monitoring period (T) (for example, five seconds) during operation to obtain the mass (m) of accumulated grain during that monitoring period T. The user preferably enters the width of the header (i.e., header width ($W_h$)) into the monitor system 320 prior to operation. The monitor system 320 determines a distance traveled (D) by integrating the speed (measured, e.g., by the speed sensor 340) over the monitoring period T. The yield (Y) can then be calculated using the following equation:

$$Y = \frac{m}{DW_h}$$

The yield data may be corrected for moisture using the signal from the moisture sensor 330 and reported in dry bushels per acre as is known in the art. The locations in the field associated with each monitoring period T are established using the GPS system 355 and recorded by the monitor system 320. The GPS and yield data may then be used to produce a yield map illustrating the spatial variation in yield.

Vehicle Weight System Calibration Methods

Figure 6:
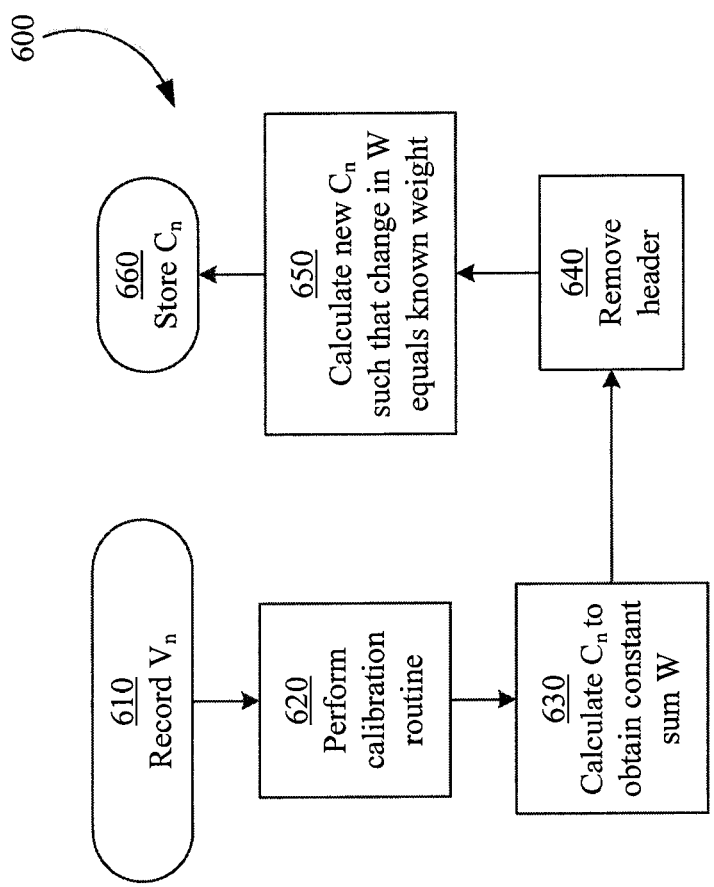
FIG. 6 is a process flow diagram illustrating a method of calibrating a vehicle weight system.

Under some methods of calibrating of the vehicle weight system 400, appropriate multipliers are preferably determined to apply to the signal sent by each extensometer 500 such that the sum of the signals multiplied by their individual multipliers is substantially proportional to the weight of the combine 10. FIG. 6 is a flow diagram showing a process 600 for calibrating a vehicle weight system. At step 610, the monitor system 320 records the signals $V_1$ through $V_n$ sent by each extensometer 500. At step 620, the monitor system directs the operator to perform a calibration maneuver such that the various tires carry different fractions of the weight of the combine 10. For example, the monitor system may instruct the operator to drive the combine on a substantially flat surface at a given speed.

Because the total weight of the combine 10 does not change substantially throughout the calibration maneuver, the relationship between the signals $V_n$ may be modeled by a relationship such as:

$$W = \sum_{n=1}^{N} C_n V_n(t)$$

Where:
W—is a constant because the weight of the combine is constant (note: W may not represent the actual weight of the combine 10)
$V_n$—represents the signal sent by the nth extensometer 500
$C_n$—is a coefficient representing a calibration factor or multiplier associated with the nth extensometer 500.
t—is time in seconds.

Thus, at step 630 the monitor system 320 preferably determines the set of coefficients $C_n$ that result in a constant value W throughout the calibration maneuver. It should be appreciated that in some cases a constant value W may not be obtained in practice, in which case the monitor system preferably determines the set of coefficients $C_n$ that result in the smallest variation (e.g., standard deviation) of W throughout the calibration maneuver.

At step 640, a known weight is added or removed from the system. For example, the header 15 may be removed from the combine 10 such that the total weight of the combine decreases by the known weight of the header. At step 650, new coefficients $C_n$ are calculated so that the change in W is equal to the known change in weight of the combine. For example, the coefficients $C_n$ may be multiplied by a single constant equal to the decrease in W divided by the known change in weight (e.g., the weight of the header 15). At step

660, the monitor system 320 preferably stores the new coefficients $C_n$ for application to subsequent weight measurements.

In an optional setup phase prior to the calibration described in process flow diagram 600, the monitor system 320 preferably instructs the operator to carry out a routine similar to the calibration routine 620 such that the fraction of weight carried by the various tires changes. As each subroutine is carried out, the monitor system 320 evaluates the change in the signals $V_n$ and determines whether the changes in signals correspond to the expected change in the fraction of weight carried by each tire. For example, if the monitor system instructs the operator to accelerate the vehicle, an increase in the signals from the rearwardly disposed front and rear extensometers 500f2 and 500r2 should be observed. If no such change is observed, the monitor system 320 preferably instructs the operator to ensure that the rearwardly disposed extensometers 500f2 and 500r2 are properly installed.

In an optional system evaluation phase, the monitor system 320 determines new coefficients $C_n$ (as performed at step 630 in process flow 600) while the combine 10 is moving but not harvesting. As an example, the monitor system 320 may initiate step 630 of process 600 when the GPS system 355 indicates that the combine 10 is moving faster than 10 miles per hour or any predetermined speed above which the combine 10 is likely in a transport mode and not harvesting. It should be appreciated that calculating new coefficients $C_n$ while in transport is preferable because the weight of the combine 10 is shifting between the load-bearing members but the combine is not accumulating grain.

Non-Trusted Data

In operation of the vehicle weight system 400, certain environmental and operating parameters occasionally cause inaccuracy of the vehicle weight data. Such data is preferably identified by the monitor system and is preferably not used to calibrate the mass flow rate signal provided by the mass flow sensor 130.

Figure 9:
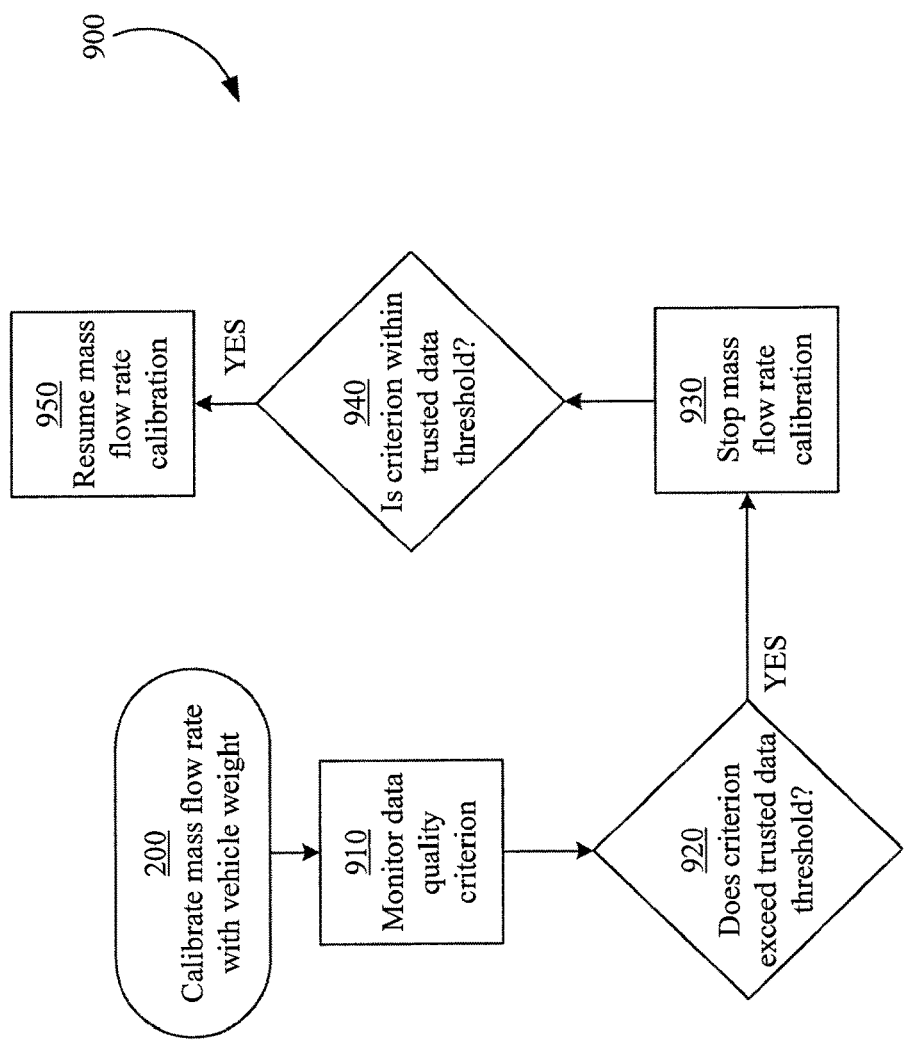
FIG. 9 illustrates a process for identifying non-trusted vehicle weight data.

Thus, a preferred process 900 for filtering non-trusted vehicle weight data is shown in the flow diagram of FIG. 9. At step 200 the monitor system 320 preferably calibrates the mass flow rate signal using the vehicle weight according to the process 200 described with respect to FIG. 2A. At step 910 the monitor system 320 preferably monitors a data quality criterion. The data quality criterion preferably comprises a signal corresponding to the accuracy of data generated by the vehicle weight system 400. At step 920, the monitor system 302 preferably compares the data quality to a predetermined threshold. The threshold may comprise a predetermined percentage or number of standard deviations from of the average data quality criterion or simply a predetermined value. The threshold preferably lies between a non-desired data quality range and a desired data quality range.

If the data quality criterion exceeds the threshold, then at step 930 the monitor system preferably calibrates the mass flow rate signal with vehicle weight data. In carrying out the step 930, the monitor system 320 preferably continues recording data from the vehicle weight system 400, but stops using the vehicle weight system. In embodiments in which the monitor system 320 calibrates mass flow sensor using a correction factor (e.g., as described with respect to FIG. 2B), the monitor system may continue using the last correction factor calculated before the data quality criterion exceeded the trusted data threshold.

At step 940 the monitor system preferably determines whether the data quality criterion is below the trusted data threshold (i.e., whether vehicle weight data can again be trusted). If so, at step 950, the monitor system 320 preferably resumes calibration of mass flow rate with vehicle weight data.

Non-Trusted Data—Unloading Operations

During operation of the calibration system 300, the operator will occasionally activate the unloading auger 30 of the combine 10 in order to remove accumulated grain 110 from the grain tank 20 of the combine. Often this operation is carried out while harvesting, with a tractor pulling a grain cart or auger wagon alongside the combine 10. During such operations, the weight of the combine changes due to unloading and thus vehicle weight should not be used to calibrate the mass flow sensor 130 as described herein. Thus an auger weight sensor 335 is preferably included in the embodiment of the calibration system 300 as illustrated in FIG. 3.

The weight sensor 335 may comprise a strain gauge attached to any load-bearing member of the combine 10 bearing the weight of the unloading auger 30 and configured to measure the deformation (e.g., strain) of the load-bearing member, or any other sensor configured to send a signal proportional to the weight of the unloading auger 30. In a setup phase, the monitor system 320 records a value of the signal from the auger weight sensor 335 when there is no grain in the unloading auger 30. In operation, when the combine unloads grain through the unloading auger 30, the weight of the unloading auger increases and the signal from the auger weight sensor 335 increases. When the signal from the auger weight sensor 335 reaches a threshold level in excess of the value recorded in the setup phase, the monitor system 320 enters non-trusted data mode as described with respect to FIG. 9. It should be appreciated that when the unloading auger 30 is turning, the frequency content of the auger weight sensor signal will change because the unloading auger will undergo substantial vertical vibration. Thus in an alternative method, the frequency spectrum of the auger weight sensor signal is used to determine when the auger is turning. When the auger weight sensor signal includes a frequency component within a predetermined range having an amplitude within a predetermined range, the monitor system 320 preferably enters non-trusted data mode.

In addition, the signal from the auger weight sensor 335 may be used to determine whether the grain tank 20 has been completely emptied. If the operator unloads only a portion of the grain tank 20 and stops the unloading auger 30, then the frequency of auger weight sensor signal will return below its threshold value (indicating that the unloading auger is not rotating) but the value of the signal will remain above its threshold value because the unloading auger cannot empty until the grain tank 20 is emptied. Thus when the auger weight sensor signal returns below its threshold value, the monitor system 320 preferably determines that the grain tank 20 is empty and may perform any step that requires an empty grain tank, such as comparing the sum of the extensometer signals to the sum measured during setup or visually indicating to the operator that the grain tank is empty.

Non-Trusted Data—Vehicle Dynamics

The accelerometer 350 is preferably oriented and configured to send a signal to the yield monitor board 310 related to the acceleration or deceleration of the combine 10 along the direction of travel. Because excessive acceleration or deceleration can impose excess loads on the vehicle weighing apparatus, the monitor system 320 preferably enters the non-trusted data mode when the accelerometer signal exceeds a predefined threshold value. Similarly, the gyroscope 345 is preferably oriented and configured to send signals to the yield monitor board 310, which signals are related to the pitch and roll of the combine 10. Because excessive pitch or roll of the combine 10 causes the vehicle weighing apparatus to undergo loads which may not be directly related to the weight of the combine, the monitor system 320 preferably enters the non-trusted data mode when either of the gyroscope signals exceeds predefined threshold values.

Non-Trusted Data—Head-Ground Contact

Figure 8:
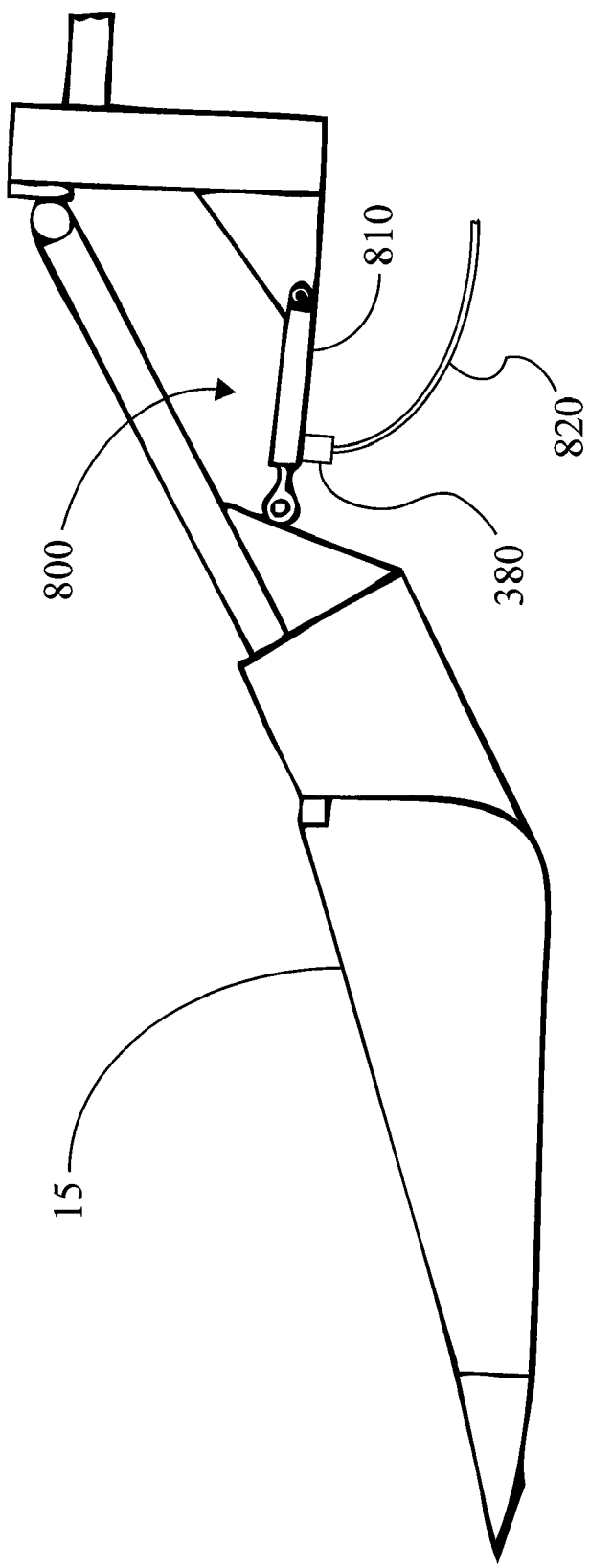
FIG. 8 is a side elevation view of an embodiment of a head pressure sensor.

It should be appreciated that when the header 15 contacts the ground, the ability of a vehicle weight system 400 to weigh the combine 10 is compromised because a portion of the vehicle weight is carried by the head. Thus the header pressure sensor 380 may be used in applications in which the header 15 occasionally or regularly contacts the ground. The header pressure sensor 380 may comprise any pressure sensor configured to produce a signal corresponding to the pressure in one or more hydraulic actuators used to position the header 15. FIG. 8 illustrates a header pressure sensor 380 in fluid communication with the work chamber 810 of a hydraulic actuator 800. In the illustrated embodiment, the header pressure sensor 380 is installed such that fluid from a pressure supply line 820 flows through the header pressure sensor 380 before entering the work chamber 810. The header pressure sensor 380 may comprise a pressure transducer such as those manufactured by Gems Sensors & Controls in Plainville, Conn. The header pressure sensor 380 sends a signal to the yield monitor board 310 corresponding to the pressure in the work chamber 810.

In operation, the monitor system 320 preferably compares the signal from the header pressure sensor 380 to a threshold value corresponding to the pressure required to hold up the header 15 just above the surface. As the pressure decreases below the threshold pressure, the difference in pressure corresponds to the weight of the header carried by the ground. During operation, the monitor system 320 preferably subtracts this weight from the vehicle weight measured by the vehicle weight system 400. In some applications, particularly where it is not expected that the header 15 will contact the ground frequently during operation, the signal from the header pressure sensor 380 may be used simply to determine whether the monitor system 310 should enter non-trusted data mode.

Non-Trusted Data—Phantom Payload

Figure 4C:
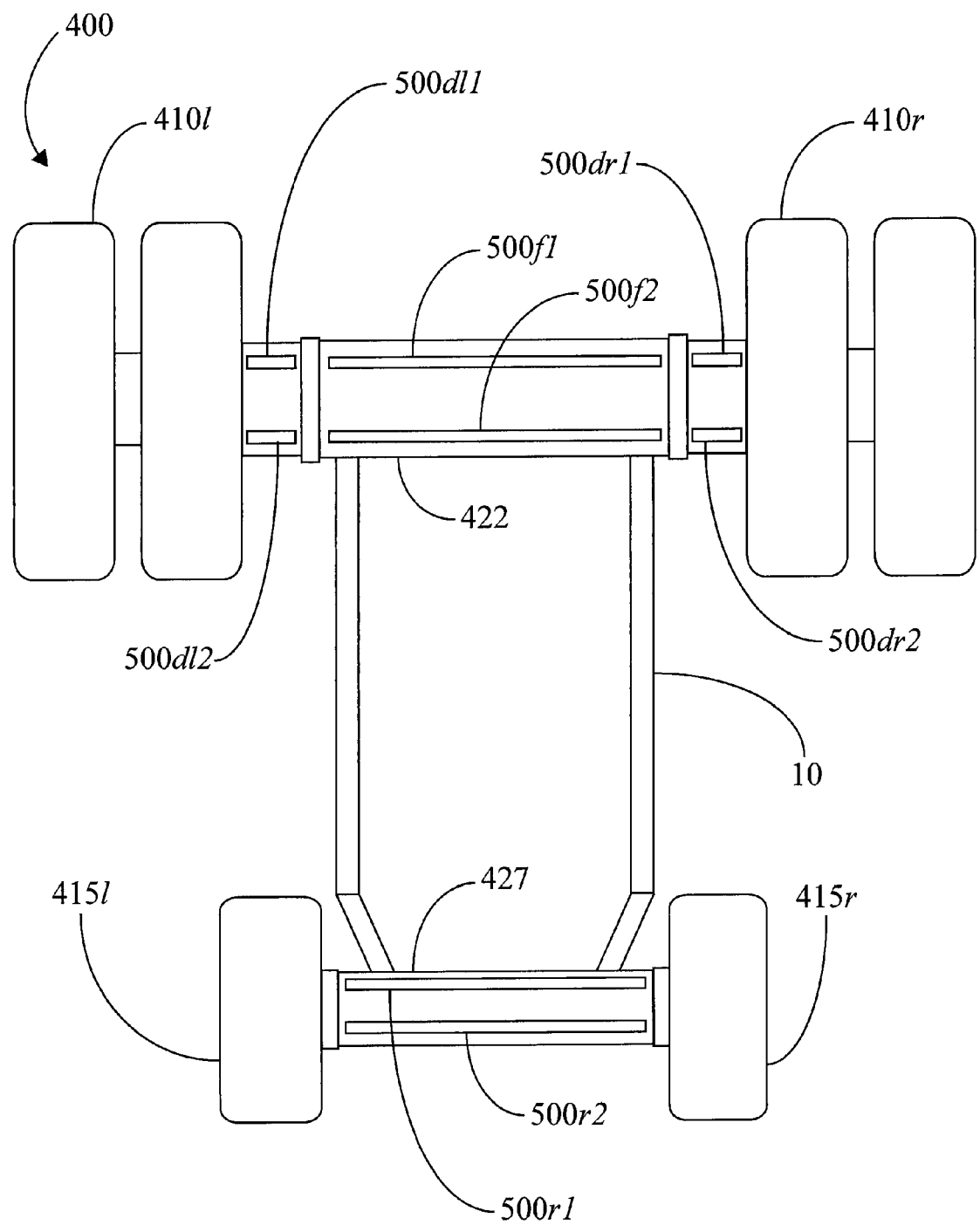
FIG. 4C is a top plan view of another embodiment of a vehicle weight system.

In some embodiments, the monitor system 320 also preferably enters non-trusted data mode when the effective point of loading on tires 410 shifts. FIG. 4C illustrates a combine 10 having dual front tires 410 as is common in commercially available combines. In operation, if the weight of the combine 10 shifts off of an inside dual tire and onto an outside dual tire (as, for example, when the outside dual tire encounters a steep slope or obstruction) the effective point of loading shifts away from the center of the front axle 422. Thus the bending of the front axle 422 increases such that the signal from extensometers 500f1 and 500f2 increases, even though the weight of the combine has not changed. This false signal is described herein as "phantom signal" and the resulting calculated load is described herein as "phantom payload."

To detect phantom payload, the embodiment of the vehicle weight system 400 illustrated in FIG. 4C preferably includes dual extensometers 500dl1 and 500dl2 between the left front tires 410l and the extensometers 500f1 and 500f2. In addition, the same embodiment preferably includes dual extensometers 500dr1 and 500dr2 between the right front tires 410r and the extensometers 500f1 and 500f2. The dual extensometers 500d are preferably mounted to the combine 10 using a bracket or other suitable apparatus. The dual extensometers 500d are in electrical communication with the yield monitor board 310. It will be appreciated in light of the disclosure of this application that a single extensometer 500d may be mounted near each dual tire 410, but two extensometers are preferably included (as illustrated in FIG. 4C) to cancel the effects of torsion and non-vertical bending. When the sum of the signals from either pair of dual extensometers 500d exceeds a threshold value, the monitor system 320 preferably enters a non-trusted data mode.

Figure 4D:
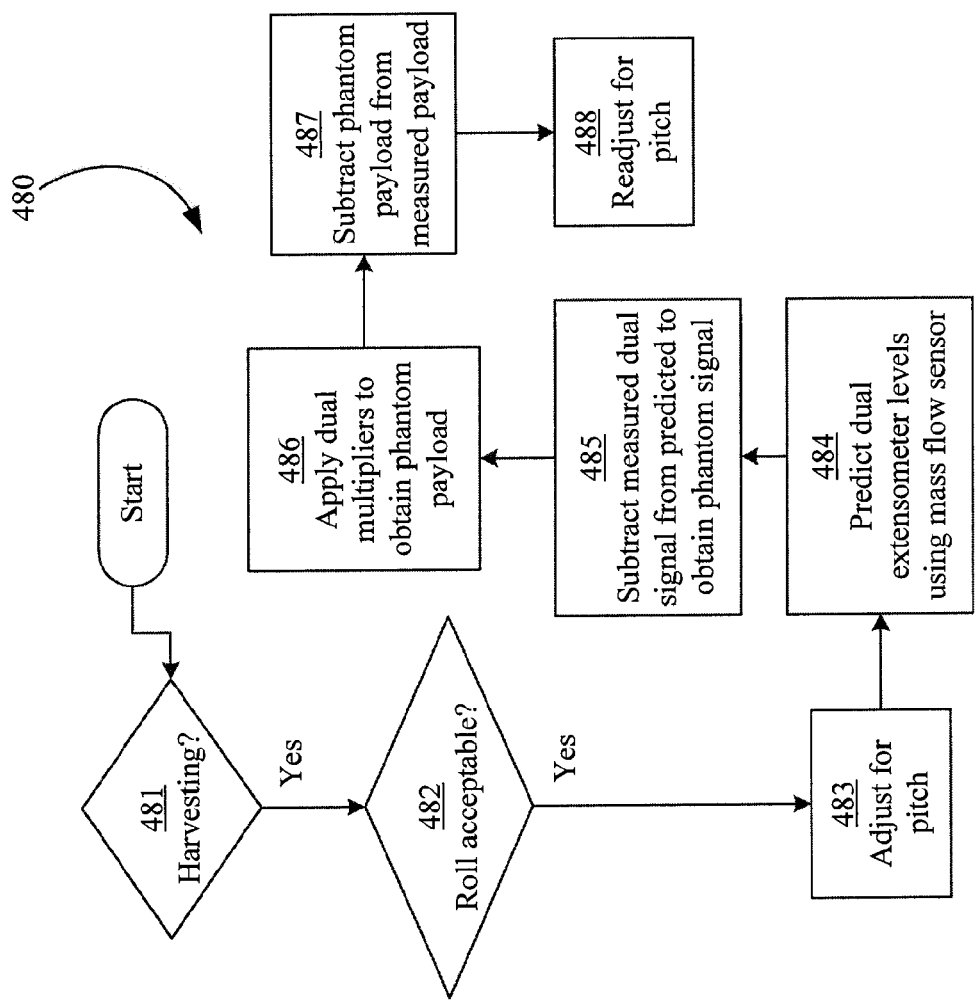
FIG. 4D is a flow diagram illustrating a process for detecting phantom payloads.

Using the vehicle weight system embodiments described herein with respect to FIG. 4C, the monitor system 320 may detect phantom payload when the ratio between the signals from either pair of additional dual extensometers 500d and the front extensometers 500f exceeds a threshold value. In one method, the monitor system 320 may simply enter the non-trusted data mode when phantom payload is detected. However, according to another method as shown in the flowchart of FIG. 4D, the monitor system 320 may also calculate and subtract the detected phantom payload from the measured payload. In the process flowchart 480 of FIG. 4D, at step 481, the monitor system preferably determines that the combine 10 is harvesting according to a number of indicators, including: (a) whether the head is lowered using the head weight sensor 380; (b) whether vertical acceleration is noisy using the accelerometer 350; (c) whether the combine is turning using the gyroscope 345; or (d) whether the combine speed is within a predetermined range (e.g., two and seven miles per hour) using the GPS system 355 or speed sensor 340.

If the combine 10 is harvesting, then at step 482 the monitor system 320 determines whether the roll of the combine is within an acceptable predetermined range using the gyroscope 345. If the roll is acceptable, the combine preferably adjusts the front-axle and dual extensometer signals at step 483 to calculated "no pitch" signals by determining the pitch using the accelerometer 350, determining a pitch factor by which the front axle load is affected due to combine pitch, and dividing the signals by the pitch factor. At step 484 the monitor system 320 preferably determines predicted "no-pitch" dual extensometer signals using the mass flow sensor 360 to determine the change in grain weight. At step 485, the monitor system 320 preferably subtracts each predicted "no-pitch" dual extensometer signal from the corresponding calculated "no-pitch" dual extensometer signal to obtain the "phantom signal." At step 486, the monitor system 320 preferably applies the multipliers calculated for the dual extensometers 500d (as described with respect to FIG. 6) to each "phantom signal" and sums the "phantom signals" to obtain the total "phantom payload." At step 487, the monitor system 320 preferably subtracts the "phantom payload" from the total "no-pitch" load on the front axle 422 to obtain the corrected "no-pitch" load on the front axle. At step 488 the monitor system 320 preferably readjusts the "no-pitch" load on the front axle 422 by multiplying it by the pitch factor calculated at step 483. Thus the monitor system 320 is able to remove "phantom payload" from the measured vehicle weight.

Alternatives—Vehicle Weight Systems

Figure 7A:
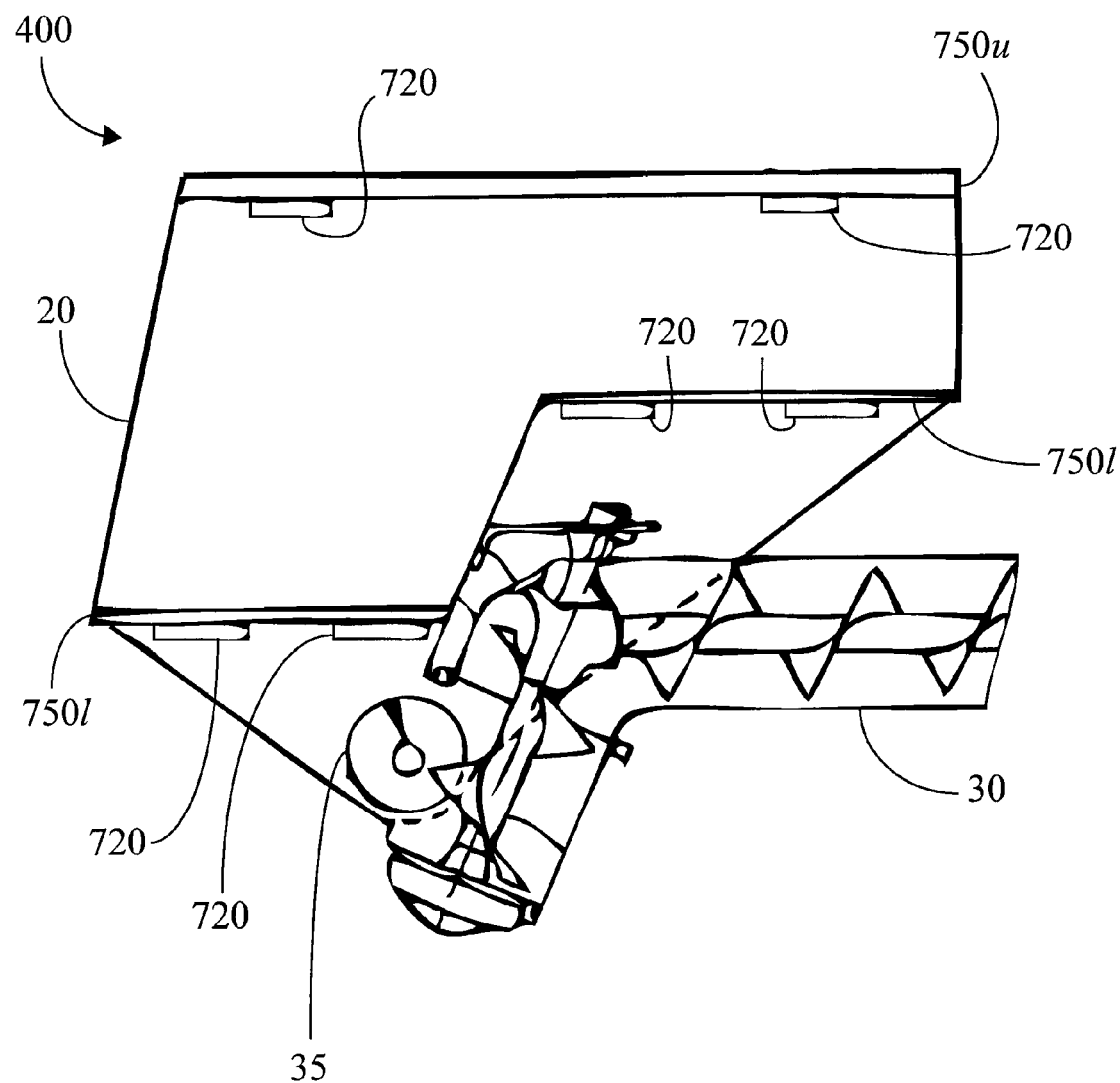
FIG. 7A illustrates one embodiment of a system for measuring grain weight or the change in weight of the grain tank as it is filled with grain.
Figure 7B:
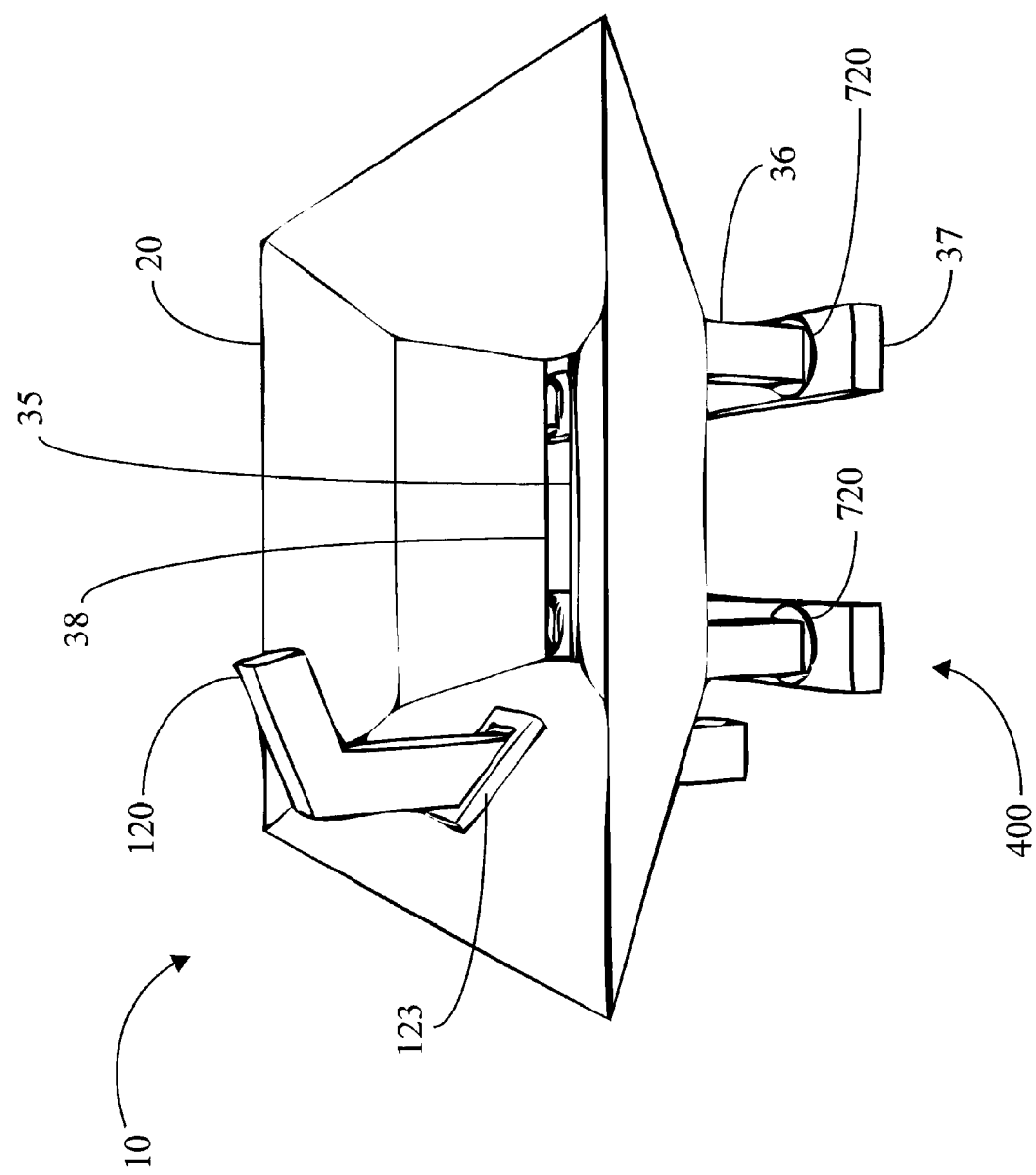
FIGS. 7B-7E illustrate different views of another embodiment for measuring grain weight or the change in weight of the grain tank as it is filled with grain.
Figure 7C:
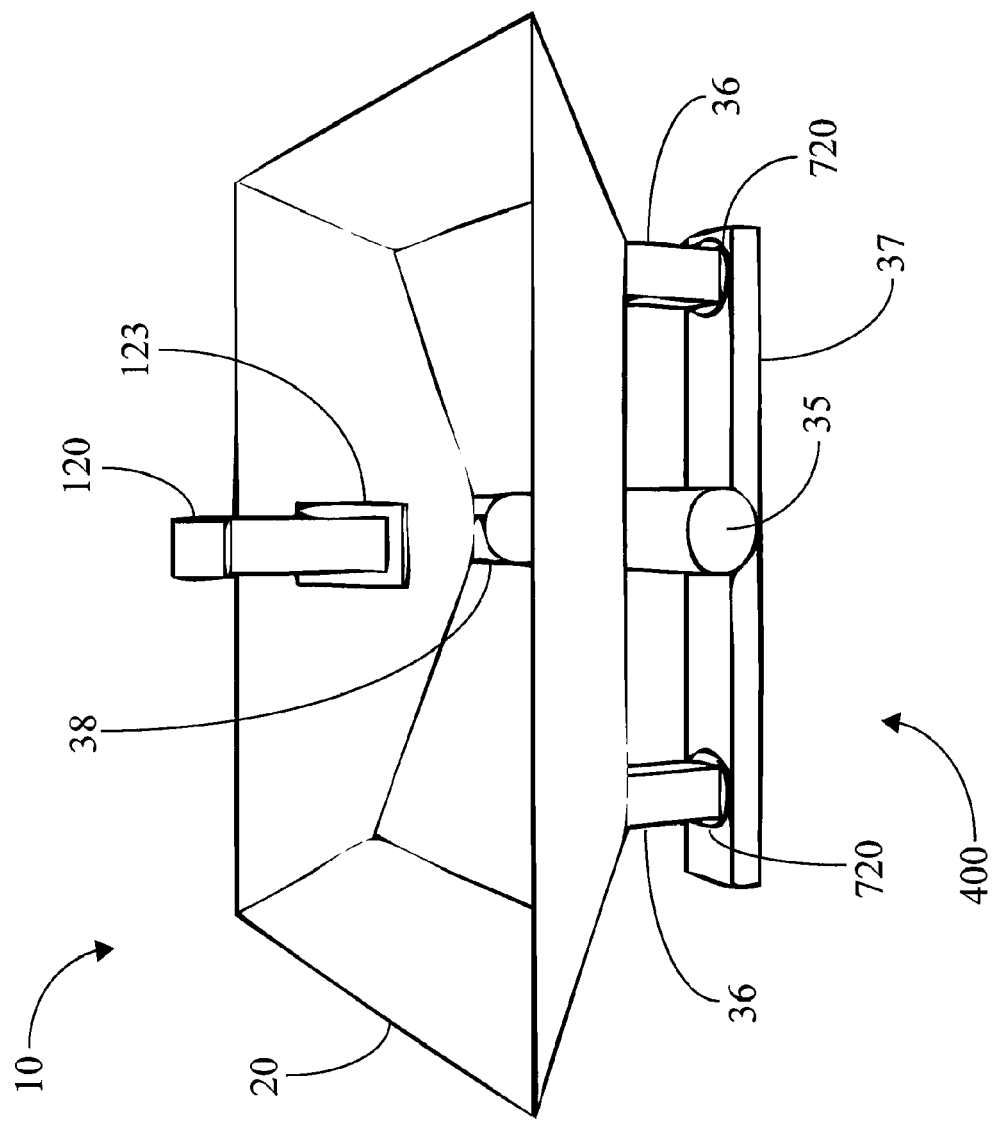
Figure 7D:
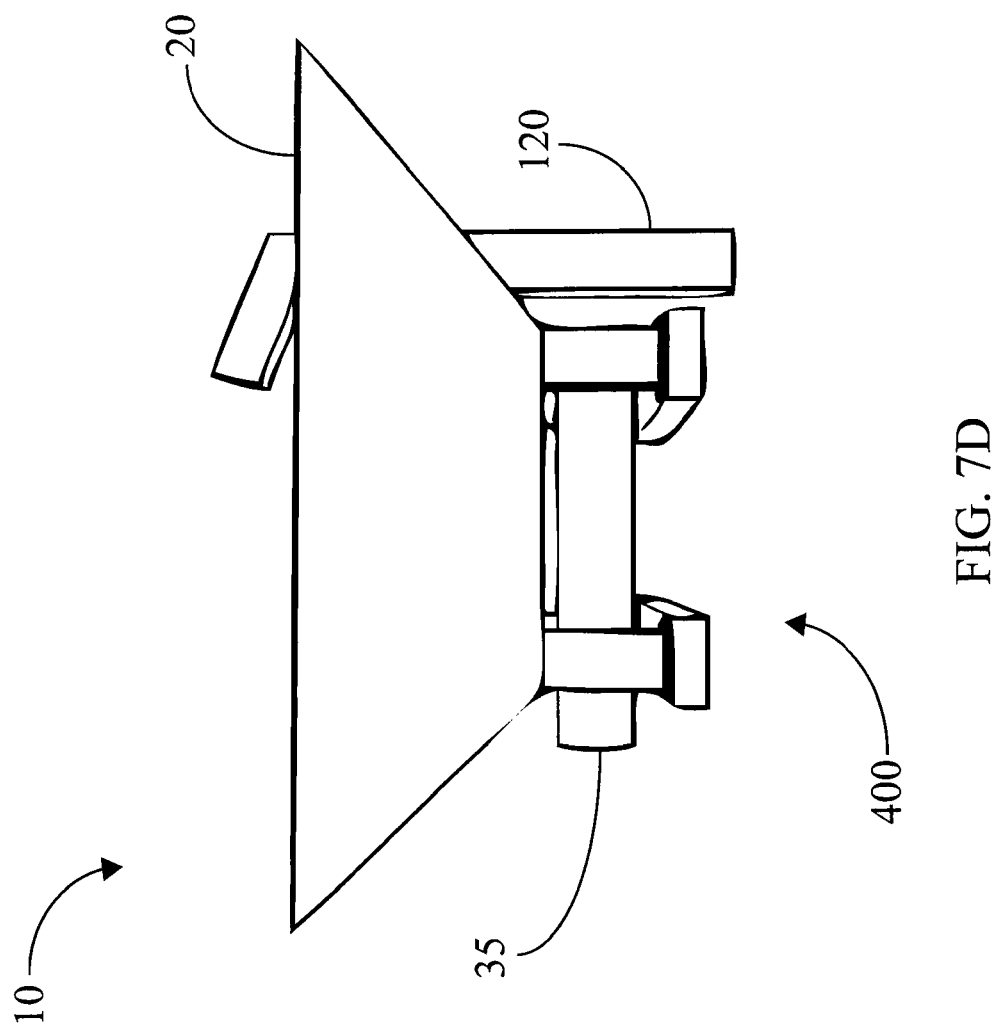
Figure 7E:
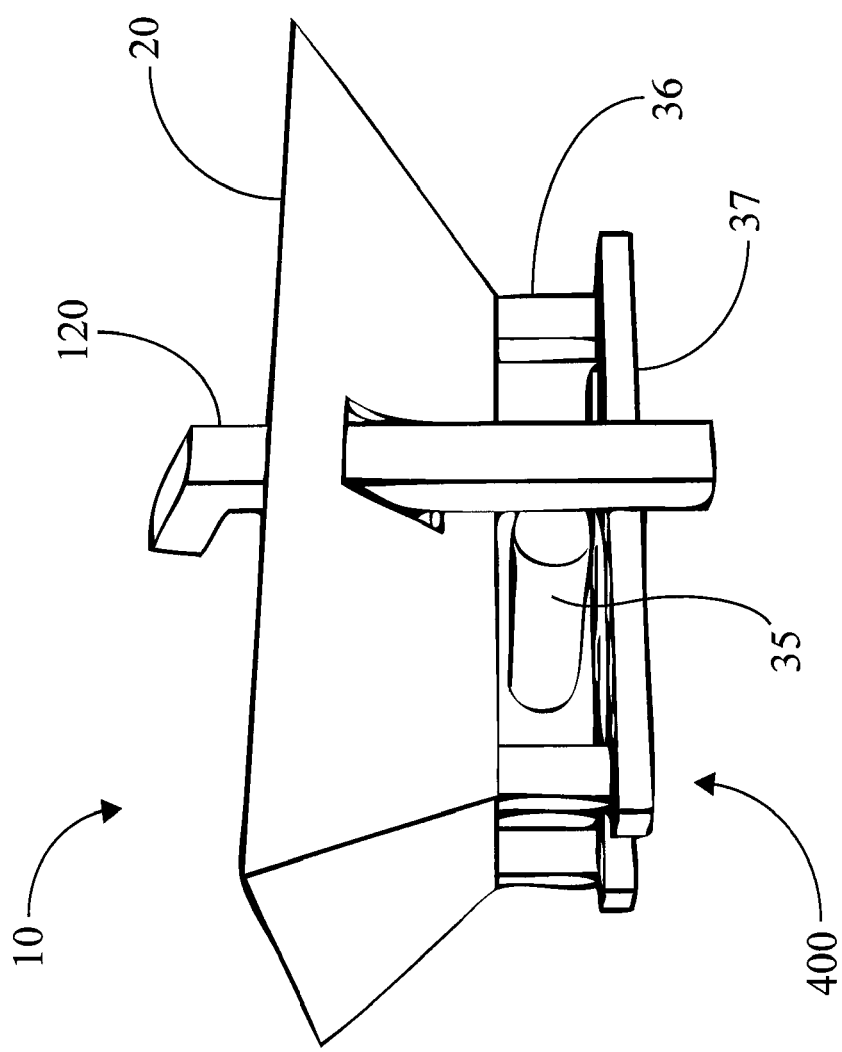

It should be appreciated that the method of calibrating the mass flow sensor 130 described herein, as well as the system for performing the method, could be carried out with any apparatus configured to measure the weight (or change in weight) of the combine 10 or of the grain tank 20 containing clean grain 110. FIG. 7A illustrates an alternative embodiment of the vehicle weight system 400 in which the grain tank 20 of the combine 10 is supported by load cells 720. Each load cell 720 is fitted with strain gauges or other devices configured to send a signal proportional to the compression of the load cell. In the illustrated embodiment, the grain tank 20 includes upper and lower ridges 750*u* and 750*l*. The load cells are mounted between the ridges 750 and the combine frame. It should be appreciated that other embodiments of the vehicle weight system may include load cells 720 in other locations and orientations supporting the weight of the grain tank 20.

However, as best viewed in FIG. 1A, in most commercially available combines the grain elevator 120 and cross-auger 35 both comprise load-bearing and load-imposing members with respect to the grain tank 20, such that it is difficult to determine the weight of the grain within the grain tank without modifying the structure of the combine 10.

Thus a modified combine 10 incorporating another embodiment of the vehicle weight system 400 is illustrated in FIGS. 7B-7E. In this embodiment, the weight of the grain tank 20 is isolated from other members of the combine 10 and supported by load cells 720. The grain elevator 120 passes through the wall of the tank 20 without imposing significant loads on the tank, preferably via a seal 123 which may be constructed of any material (e.g., rubber) suitable for sealing grain in the tank while allowing the grain elevator 120 and the grain tank 20 to move relative to one another. Additionally, the cross-auger 35 is located below a transverse slot 38 in the grain tank 20 such that grain falls from the tank into the cross-auger for conveyance to the unloading auger 30. In such embodiments, a selectively closable gate or door (not shown) over the cross-auger 35 at the bottom of the grain tank 20 is preferably incorporated to retain grain in the grain tank when grain is not being unloaded. Substantially all the weight of the tank 20 thus rests on the grain tank support legs 36. Load cells 720 are interposed between grain tank support legs 36 and support members 37 of the combine frame.

It should be appreciated that in the embodiments described above with respect to FIGS. 7B-7E, the support structure and weight measurement system could be modified significantly while still obtaining a measurement related to the weight of the grain tank 20. In some embodiments, the support legs 36 could be joined directly (by welding or by joints) to the support members 37 and the support legs 36 instrumented with strain gauges. In other embodiments, the support legs 36 could be joined to the support members 37 by instrumented pins.

In the embodiments discussed above with respect to FIG. 7A or the embodiments discussed above with respect to FIGS. 7B-E, each load cell 720 is in electrical communication with the yield monitor board 310. It will be appreciated that the sum of the signals from the load cells 720 sent to the tank is proportional to the weight of the grain tank and its contents. Calibration of the embodiment of the vehicle weight system 400 may be accomplished by recording a first sum of the load cell signals $S_1$ when the grain tank 20 is empty, adding a known weight $W_{cal}$ to the grain tank, and recording a second sum of the load cell signals $S_2$ with the known weight in place. The ratio of $W_{cal}$ to the difference between $S_2$ and $S_1$ constitutes a calibration characteristic k (in units of, for example, pounds per milli-volt). Thus, as grain is added to the tank during operation, grain weight $W_g$ may be represented in terms of the currently recorded sum of load cell signals S as follows:

$$W_g = k(S - S_1)$$

In some embodiments, the response of the load cells may be non-linear such that the calibration characteristic k should be replaced with a characteristic curve (e.g., curve 280 of FIG. 2C) relating a set of known weights to load cell signals. In other embodiments, it may be preferable to carry out a calibration maneuver and obtain a set of multipliers corresponding to each load cell 720 as described with respect to FIG. 6.

Alternatives—Mass Flow Sensors

Figure 1C:
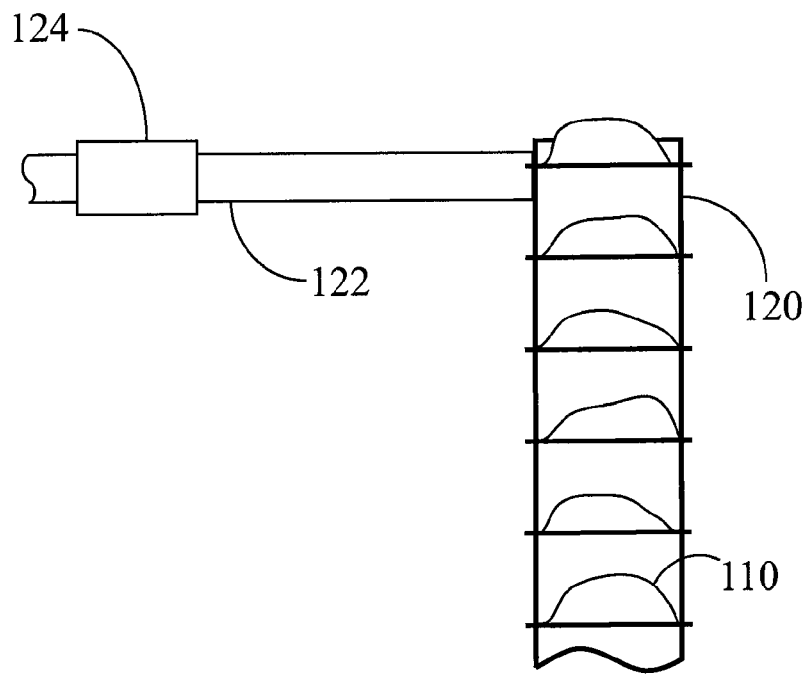
FIG. 1C illustrates another embodiment of a mass flow sensor.

It should also be appreciated that the mass flow sensor 130 need not comprise the impact plate type illustrated in FIG. 1B but may comprise any sensor configured to send a signal corresponding to the mass flow rate of grain in the combine 10. For example, FIG. 1C illustrates a grain elevator 120 driven by a driveshaft 122. A torque sensor 124 is coupled to the drive shaft 122. The torque sensor 124 is in electrical or wireless communication with the yield monitor board 310. The torque sensor 124 may be an inline rotary torque sensor such as those available from FUTEK Advanced Sensor Technology, Inc in Irvine, Calif. The torque sensor 124 is preferably configured to produce a signal corresponding to the torque on the drive shaft 122. The torque on the drive shaft 122 increases with the weight of grain 110 being carried by the grain elevator 120. Thus the signal from torque sensor 124 may be used to measure the weight of grain 110 in the grain elevator 120 at a given time. According to one method of using the embodiment of the mass flow sensor 130, the speed of the drive shaft 122 may be measured using a speed sensor similar to speed sensor 340 or other suitable apparatus. Using the speed of the drive shaft 122 and known length of the grain elevator 120, the yield monitor board preferably determines when the grain elevator has made a complete cycle and records the weight of the grain 110 added to the combine in each cycle.

Figure 1D:
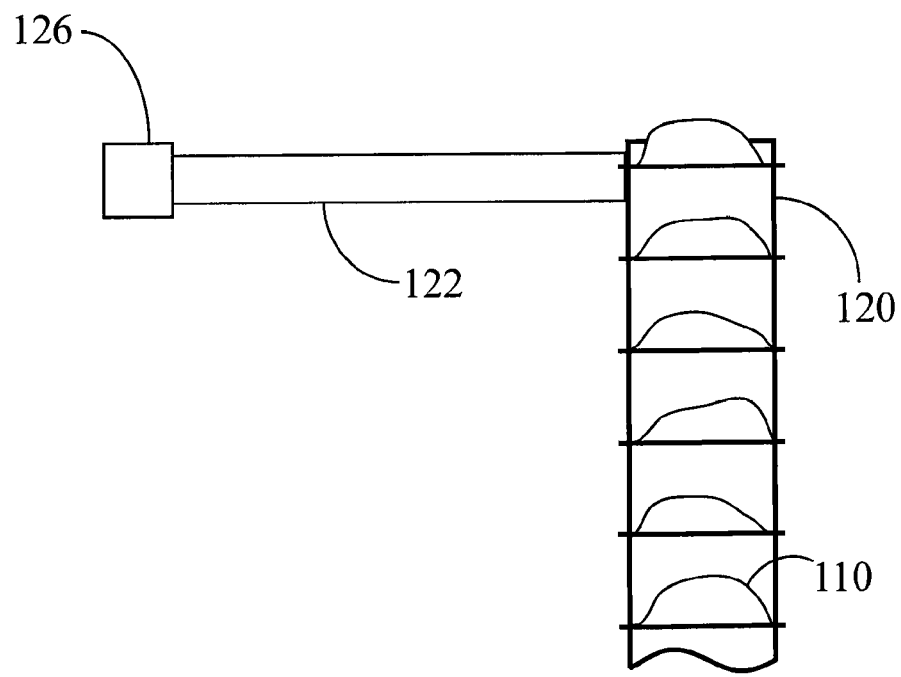
FIG. 1D illustrates yet another embodiment of a mass flow sensor.

In another embodiment of the mass flow sensor 130 illustrated in FIG. 1D, driveshaft 122 is driven by an electric or hydraulic motor 126. The power drawn by the motor 126 is measured as is known in the art and reported to the yield monitor board 310. Like the torque on the driveshaft 122, the power drawn by the motor 126 is related to the weight of grain 110 in the grain elevator 120 and may be used by the monitor system 320 to measure a flow rate of grain 110 according to the method described above.

In other embodiments, the mass flow sensor 130 may comprise an apparatus used to measure the weight of the clean grain 110 as it moves through the combine 10 as is disclosed in U.S. Pat. No. 5,779,541, the disclosure of which is hereby incorporated by reference in its entirety.

Other types of mass flow sensors which may be calibrated by the method described herein include optical mass flow sensors as are known in the art.

The foregoing description is presented to enable one of ordinary skill in the art to make and use the systems, methods and apparatus described herein and is provided in the context of a patent application and its requirements. Various modifications to the preferred embodiment of the apparatus, and the general principles and features of the system and methods described herein will be readily apparent to those of skill in the art. Thus, the invention is not to be limited to the embodiments of the apparatus, system and methods described above and illustrated in the drawing

The invention claimed is:

1. A method of calibrating a mass flow sensor of a harvester while harvesting grain, the method comprising:
   harvesting grain with a harvester;
   as the grain is harvested, measuring a mass flow rate of the harvested grain with a mass flow sensor to obtain a flow-based weight estimate;
   collecting the harvested grain in a grain tank on the harvester;
   measuring a weight of the harvested grain collected in the grain tank at a first time;
   measuring a weight of the harvested grain collected in the grain tank at a second time;
   determining a measured change in grain weight in the grain tank between the first time and the second time;
   performing a calibration routine corresponding to a known change in vehicle weight;
   comparing the measured change in grain weight to the known change in vehicle weight;
   determining a weight correction factor for correcting the measured change in grain weight to the known change in vehicle weight; and
   applying the weight correction factor to a subsequent measurement of a weight of the harvested grain.

2. The method of claim 1, claim 1, further including:
   monitoring the weight measurements with respect to a data quality criterion; and
   filtering the weight measurements as non-trusted vehicle weight data which do not meet the data quality criterion.

* * * * *